United States Patent
Sharma et al.

(10) Patent No.: US 12,535,216 B1
(45) Date of Patent: Jan. 27, 2026

(54) COMBUSTION SECTION FOR A TURBINE ENGINE

(71) Applicant: GENERAL ELECTRIC COMPANY, Evendale, OH (US)

(72) Inventors: Vivekta Sharma, Bengaluru (IN); Pradeep Naik, Bengaluru (IN); Karthikeyan Sampath, Bengaluru (IN); Perumallu Vukanti, Bengaluru (IN); Pabitra Badhuk, Jhargram (IN); Sibtosh Pal, Mason, OH (US); Prithiviraaj Pet T, Madurai (IN); Michael T. Bucaro, Arvada, CO (US); Maximilian Zahn, Munich (DE)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 19/007,701

(22) Filed: Jan. 2, 2025

(51) Int. Cl.
  *F23R 3/28* (2006.01)
  *F23R 3/14* (2006.01)

(52) U.S. Cl.
  CPC ............... *F23R 3/286* (2013.01); *F23R 3/14* (2013.01)

(58) Field of Classification Search
  CPC .................................. F23R 3/14; F23R 3/286
  See application file for complete search history.

(56) References Cited

U.S. PATENT DOCUMENTS

| | | | | |
|---|---|---|---|---|
| 4,830,315 A | * | 5/1989 | Presz, Jr. | ............... F01D 5/141 |
| | | | | 244/130 |
| 5,613,363 A | * | 3/1997 | Joshi | ................ F23R 3/286 |
| | | | | 60/737 |
| 5,647,200 A | * | 7/1997 | Althaus | ................ F23R 3/16 |
| | | | | 60/737 |
| 5,941,064 A | * | 8/1999 | Chevalier | ............... F23R 3/20 |
| | | | | 60/768 |
| 8,061,142 B2 | | 11/2011 | Kasturp et al. | |
| 8,186,166 B2 | | 5/2012 | Varatharajan et al. | |
| 8,276,385 B2 | | 10/2012 | Zuo et al. | |
| 8,322,143 B2 | | 12/2012 | Uhm et al. | |
| 8,424,311 B2 | | 4/2013 | York et al. | |
| 8,528,337 B2 | * | 9/2013 | Berry | ................. F23D 14/62 |
| | | | | 60/737 |
| 8,539,773 B2 | | 9/2013 | Ziminsky et al. | |
| 8,875,516 B2 | | 11/2014 | Uhm et al. | |
| 9,134,023 B2 | | 9/2015 | Boardman et al. | |
| 9,347,663 B2 | * | 5/2016 | Poyyapakkam | ........ F23C 7/004 |
| 9,557,061 B2 | | 1/2017 | Biagioli et al. | |
| 9,650,959 B2 | | 5/2017 | Boardman et al. | |
| 10,082,294 B2 | | 9/2018 | Laster et al. | |

(Continued)

FOREIGN PATENT DOCUMENTS

| CN | 110939530 A | | 3/2020 |
|---|---|---|---|
| CN | 117469694 A | * | 1/2024 |

(Continued)

*Primary Examiner* — Craig Kim
(74) *Attorney, Agent, or Firm* — Carter, DeLuca & Farrell LLP

(57) ABSTRACT

A combustion section for a turbine engine. The combustion section has a combustor and a fuel nozzle. The combustor has a combustion chamber. The fuel nozzle has a body, and a vane. The body defines a centerline. The body has a central channel. The central channel has a compressed air flow passage and a mixer. The vane extends from the body. The vane has an outer wall. The vane has a plurality of lobes.

18 Claims, 10 Drawing Sheets

(56) References Cited

U.S. PATENT DOCUMENTS

| | | |
|---|---|---|
| 10,101,032 B2 | 10/2018 | Abd El-Nabi et al. |
| 10,295,190 B2 | 5/2019 | Boardman et al. |
| 10,352,569 B2 | 7/2019 | Boardman et al. |
| 10,415,832 B2 | 9/2019 | Lee |
| 10,502,425 B2 | 12/2019 | Boardman et al. |
| 10,704,786 B2 * | 7/2020 | Laster .................... F23D 14/24 |
| 10,851,659 B2 * | 12/2020 | Yang ........................ F23R 3/12 |
| 11,242,806 B2 * | 2/2022 | Bothien .................. F23D 14/62 |
| 11,454,396 B1 | 9/2022 | Boardman et al. |
| 11,506,390 B2 | 11/2022 | Sayder |
| 12,196,421 B2 * | 1/2025 | Terrell ..................... F23R 3/16 |
| 2007/0003897 A1 | 1/2007 | Koizumi et al. |
| 2012/0285172 A1 * | 11/2012 | Poyyapakkam .......... F23R 3/14  60/737 |
| 2012/0285173 A1 * | 11/2012 | Poyyapakkam ........ F23C 7/004  60/748 |
| 2016/0146470 A1 * | 5/2016 | Dusing ................... F23R 3/286  60/737 |
| 2016/0230668 A1 * | 8/2016 | Yang ....................... F02C 7/222 |
| 2017/0350598 A1 * | 12/2017 | Boardman ................ F23R 3/14 |
| 2018/0216828 A1 | 8/2018 | Johansson et al. |
| 2023/0340915 A1 | 10/2023 | Speak et al. |
| 2023/0408094 A1 * | 12/2023 | Terrel ........................ F23R 3/16 |
| 2024/0019123 A1 | 1/2024 | D'Agostini et al. |
| 2025/0020095 A1 * | 1/2025 | Juchems .............. F02M 65/005 |

FOREIGN PATENT DOCUMENTS

| | | | |
|---|---|---|---|
| DE | 102022201182 A1 | 8/2023 | |
| EP | 0623786 A1 | 11/1994 | |
| EP | 2522911 A1 * | 11/2012 | ............. F23C 7/004 |
| EP | 2522912 A1 * | 11/2012 | ........... B01F 5/0451 |
| WO | 2013/065624 A1 | 5/2013 | |

* cited by examiner

COMBUSTION SECTION FOR A TURBINE ENGINE

TECHNICAL FIELD

The present subject matter relates generally to a combustion section for a turbine engine.

BACKGROUND

Turbine engines are driven by a flow of combustion gases passing through the engine to rotate a multitude of turbine blades, which, in turn, rotate a compressor to provide compressed air to the combustor for combustion. A combustor can be provided within the turbine engine and is fluidly coupled with a turbine into which the combusted gases flow.

Historically, hydrocarbon fuels are used in the combustor of a turbine engine. Generally, fuel and air are fed to a combustion chamber, the fuel and air are mixed, and then the fuel is burned in the presence of the air to produce hot gas. The hot gas is then fed to a turbine where it cools and expands to produce power. By-products of the fuel combustion typically include environmentally unwanted byproducts, such as nitrogen oxide and nitrogen dioxide (collectively called NOx), carbon monoxide (CO), unburned hydrocarbons (UHC) (e.g., methane and volatile organic compounds that contribute to the formation of atmospheric ozone), and other oxides, including oxides of sulfur (e.g., $SO_2$ and $SO_3$).

To reduce the environmentally unwanted byproducts, other fuels, such as hydrogen, are being explored. Hydrogen or hydrogen mixed with another element has a higher flame temperature than traditional hydrocarbon fuels. That is, hydrogen or a hydrogen mixed fuel typically has a wider flammable range and a faster burning velocity than traditional hydrocarbon-based fuels.

BRIEF DESCRIPTION OF THE DRAWINGS

A full and enabling disclosure, including the best mode thereof, directed to one of ordinary skill in the art, is set forth in the specification, which makes reference to the appended figures in which.

DETAILED DESCRIPTION

Figure 1:
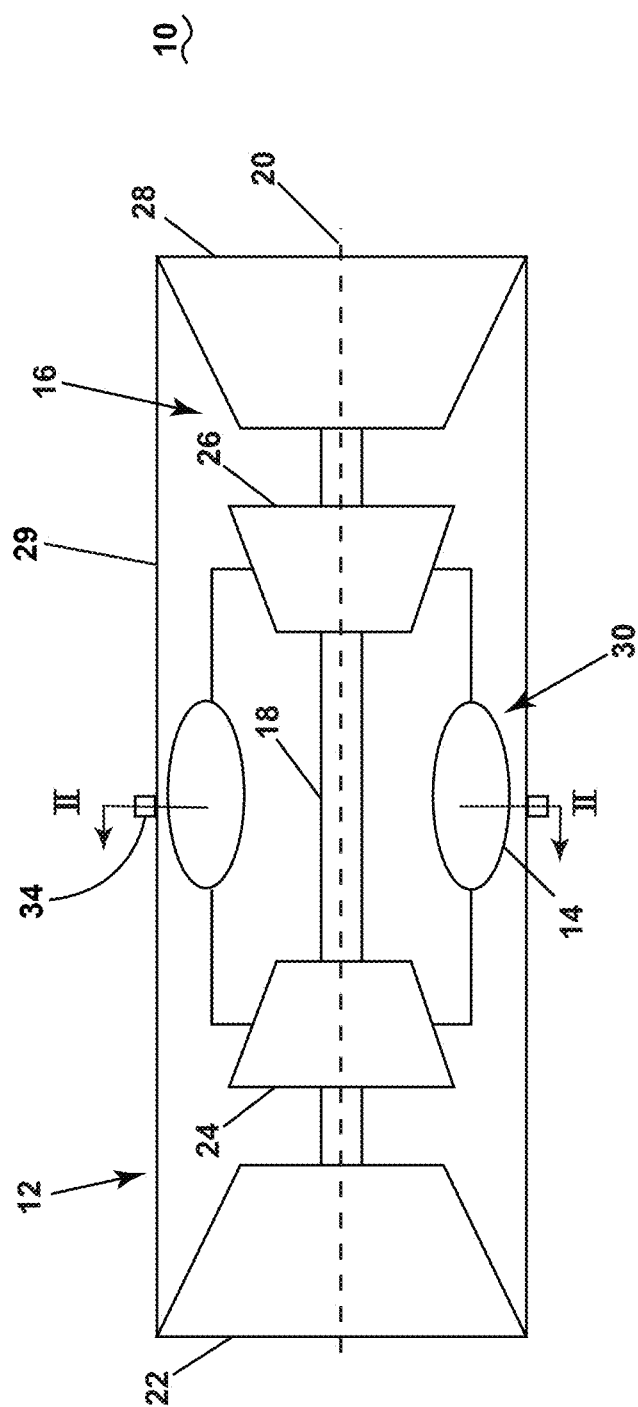
FIG. 1 is a schematic view of a turbine engine having a compressor section, a combustion section, and a turbine section in accordance with various aspects described herein.

Aspects of the disclosure described herein are directed to a combustion section for a turbine engine. The combustion section has a combustor and a fuel nozzle. The combustor has a combustion chamber. The fuel nozzle has a central channel opening to the combustion chamber. The fuel nozzle has a set of vanes located within the central channel. A plurality of lobes are located along the set of vanes. As used herein, the term "lobe" or iteration thereof refers to a geometric structure including a rounded or curved section in relation to the surrounding structure. As used herein, a "plurality of lobes" refers to two or more lobes adjacent to, opposite of and touching each other to form a continuous waveform. Each vane of the set of vanes that includes a respective plurality of lobes, as described herein, is formed with the respective plurality of lobes that extend from an upstream end and to a downstream end. The plurality of lobes form the waveform extending transverse the upstream end and the downstream end. The waveform of the plurality of lobes has an amplitude that increases towards the downstream end.

During operation, a compressed air is fed to the central channel of the fuel nozzle. The compressed air flows over the set of vanes and the plurality of lobes. The plurality of lobes are configured to create turbulence within the compressed airflow. The creation of the turbulence increases the capability of a flow of fuel to be mixed with the compressed air within the fuel nozzle.

The fuel nozzle including the plurality of lobes is especially advantageous for use when feeding a flow of hydrogen-containing fuel (hereinafter, "H2 fuel") to the combustion chamber via the fuel supply system. H2 fuel can include a gaseous H2 fuel, a liquid H2 fuel, or a combination thereof. The flow of H2 fuel can further be mixed with other fuels or fluids such as, but not limited to, natural gas, coke oven gas, diesel, Jet-A, or the like.

H2 fuels, when compared to traditional fuels (e.g., carbon fuels, petroleum fuels, etc.), have lower carbon emissions. However, H2 fuels burn hotter than and are relatively more unstable when compared to traditional fuels. For example, H2 fuels have a higher burn rate and velocity than traditional fuels. As such, an improper mixture of H2 fuel and compressed air can result in flashback occurring or a flame generated through ignition of the H2 fuel spreading to unwanted regions of the turbine engine. The improper mixture of H2 fuel and compressed air, for example, creates pockets of H2 fuel that in some instances can ignite within the fuel nozzle (e.g., flashback). The fuel nozzle, as described herein, includes the fuel nozzle having the plurality of lobes especially suited for combustion sections utilizing H2 fuel through generation of the turbulence.

The risk of flashback from occurring is further increased if a velocity of the fuel and air mixture within the fuel nozzle varies between radial location of the fuel and air mixture. Specifically, low-velocity regions of the fuel and air mixture can form near the outer radial limits of the fuel and air mixture in comparison to relatively high-velocity regions of the fuel and air mixture. The low-velocity regions of the fuel and air mixture can cause pockets of H2 fuel to form, thus increasing the risk of flashback. The fuel nozzle, as described herein, includes the fuel nozzle having the plurality of lobes that are located to reduce or otherwise eliminate the low-velocity regions, thus decreasing the risk of flashback.

For purposes of illustration, the present disclosure will be described with respect to a turbine engine. It will be understood, however, that aspects of the disclosure described herein are not so limited and that a combustion section as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

With the combustors and fuel nozzle assemblies described herein, gaseous hydrogen fuel can be used without the need of diluents. In some embodiments, no diluent is added to the combustion chamber and the fuel is substantially completely diatomic hydrogen without diluent. As used herein, the term "substantially completely," is used to describe the amount of a particular element or molecule (e.g., diatomic hydrogen), refers to at least 99% by mass of the described portion of the element or molecule, such as at least 97.5%, such as at least 95%, such as at least 92.5%, such as at least 90%, such as at least 85%, or such as at least 75% by mass of the described portion of the element or molecule. In some examples, the fuel is entirely (e.g., 100%) hydrogen by mass.

As used herein, the term "swirled" fluid flow or iterations thereof refers to an axisymmetric fluid flow having a circumferential rotation, or swirl, about a central axis. The amount of swirl that fluid flow has is quantified by a swirl number. The swirl number is defined as an integral of the tangential momentum to the axial momentum of the flow of fluid with respect to the central axis.

As used herein, the term "turbulent" fluid flow or iterations thereof refers to a non-laminar, chaotic and localized fluid flow. Turbulence, for example, can be in the form of a localized swirls, vortices or eddies. The turbulence of a turbulent fluid flow is quantified through use of turbulent kinetic energy and the Reynolds number of the fluid.

In relation to one another, the swirl of a fluid flow refers to a large-scale organized rotational movement of the fluid flow, while the turbulence of a fluid flow refers to a localized chaotic movement of the fluid flow. It will be appreciated that a fluid flow can include both swirl and turbulence.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", "third", etc. may be used interchangeably to distinguish one component from another and are not intended to signify location or importance of the individual components.

The terms "forward" and "aft" refer to relative positions within a turbine engine or vehicle and refer to the normal operational attitude of the turbine engine or vehicle. For example, with regard to a turbine engine, forward refers to a position closer to an engine inlet and aft refers to a position closer to an engine exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluidly coupled" means that a fluid is capable of making the connection between the areas specified.

The term "nozzle" has been used in various ways in the context of turbine engines. In the instant application, "nozzle" refers to a component having a portion for fluid coupling to a fuel supply and having at least one portion for fluidly coupling with a combustor portion, a combustor liner, a combustion chamber, or combinations thereof.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only, and the dimensions, positions, order, and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Uses of "and" and "or" are to be construed broadly. For example, and without limitation, uses of "and" do not necessarily require all elements or features listed, and uses of "or" are inclusive unless such a construction would be illogical.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and systems. In at least some instances, the approximating language may correspond to the precision of an instrument for measuring the value, or the precision of the methods or machines for constructing or manufacturing the components and systems. For example, the approximating language may refer to being within a 1, 2, 4, 5, 10, 15, or 20 percent margin in either individual values, range(s) of values and endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

"Proximate" as used herein is a descriptor for locating parts described herein. Further, the term "proximate" means nearer or closer to the part recited than the following part. For example, a first aperture proximate a wall, the first aperture located upstream from a second aperture means that the first aperture is closer to the wall than the first aperture is to the second aperture.

Additionally, as used herein, a "controller" can include a component configured or adapted to provide instruction, control, operation, or any form of communication for operable components to effect the operation thereof. A controller can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), proportional resonant controller (PR), a hardware-accelerated logic controller (e.g. for encoding, decoding, transcoding, etc.), the like, or a combination thereof. Non-limiting examples of a controller can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a controller can be configured for comparing a first value with a second value and operating and controlling operations of additional components based on the satisfying of that comparison. For example, when a sensed, measured, or provided value is compared with another value, including a stored or predetermined value, the satisfaction of that comparison can result in actions, functions, or operations controllable by the controller.

FIG. 1 is a schematic view of a turbine engine 10. As a non-limiting example, the turbine engine 10 can be used within an aircraft. The turbine engine 10 can include, at least, a compressor section 12, a combustion section 14, and a turbine section 16 in a serial flow arrangement. A drive shaft 18 rotationally couples the compressor section 12 and turbine section 16, such that rotation of one affects the rotation of the other and defines a rotational axis 20 for the turbine engine 10. The turbine engine 10 includes an engine casing 29. The engine casing 29 houses at least a portion of the compressor section 12, the combustion section 14, and the turbine section 16.

The compressor section 12 can include a low-pressure (LP) compressor 22, and a high-pressure (HP) compressor 24 serially fluidly coupled to one another. The turbine section 16 can include an HP turbine 26, and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft and an HP drive shaft. The LP drive shaft can couple the LP compressor 22 to the LP turbine 28, and the HP drive shaft can couple the HP compressor 24 to the HP turbine 26. An LP spool is defined as the combination of the LP compressor 22, the LP turbine 28, and the LP drive shaft such that the rotation of the LP turbine 28 can apply a driving force to the LP drive shaft, which in turn can rotate the LP compressor 22. An HP spool is defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 includes a plurality of axially spaced stages (not illustrated). Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a shroud or casing, which can extend circumferentially about and enshroud one or more sections of the turbine engine 10. It will be appreciated that the representation of the compressor section 12 is merely schematic and that there can be any number of blades, vanes and stages. Further, it is contemplated that there can be any number of other components within the compressor section 12.

Similar to the compressor section 12, the turbine section 16 includes a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section 16 can be mounted to the shroud or casing in a circumferential manner. It is noted that there can be any number of blades, vanes and turbine stages as the illustrated turbine section 16 is merely a schematic representation. Further, it is contemplated that there can be any number of other components within the turbine section 16.

The combustion section 14 is provided serially between the compressor section 12 and the turbine section 16. The combustion section 14 is fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14. The combustion section 14 includes a combustor 30.

The turbine engine 10 includes a fuel source 34. The fuel source 34 is any suitable container or vessel adapted to store a volume of fuel. The fuel within the fuel source 34 can have various states. As a non-limiting example, the fuel within the fuel source 34 can be a solid, a liquid, or a gas. The fuel source 34 is provided exterior the engine casing 29. The fuel source 34 can be provided exterior the turbine engine 10. As a non-limiting example, the turbine engine 10 can be coupled to an aircraft having a wing. The wing can include the fuel source 34. The fuel source 34 is configured to feed a flow of the fuel to the combustion section 14, specifically the combustor 30. While only a single fuel source 34 is illustrated, it will be appreciated that the turbine engine 10 can include or otherwise be coupled to any number of one or more fuel sources having any number of one or more types of fuel.

During operation of the turbine engine 10, ambient or atmospheric air is drawn into the compressor section 12 via a fan section (not illustrated) upstream of the compressor section 12, where the air is compressed defining a pressurized air. At least a portion of the pressurized air then flows into the combustion section 14 where the pressurized air is mixed with fuel from the fuel source 34 and ignited, thereby generating combustion gases. Some work is extracted from these combustion gases by the turbine section 16, which in turn drives the compressor section 12 and the fan section through the drive shaft 18. The combustion gases are ultimately discharged from the turbine engine 10 via an exhaust section (not illustrated) downstream of the turbine section 16. The pressurized airflow and the combustion gases can together define a working airflow that flows through the compressor section 12, the combustion section 14, and the turbine section 16 of the turbine engine 10.

Figure 2:
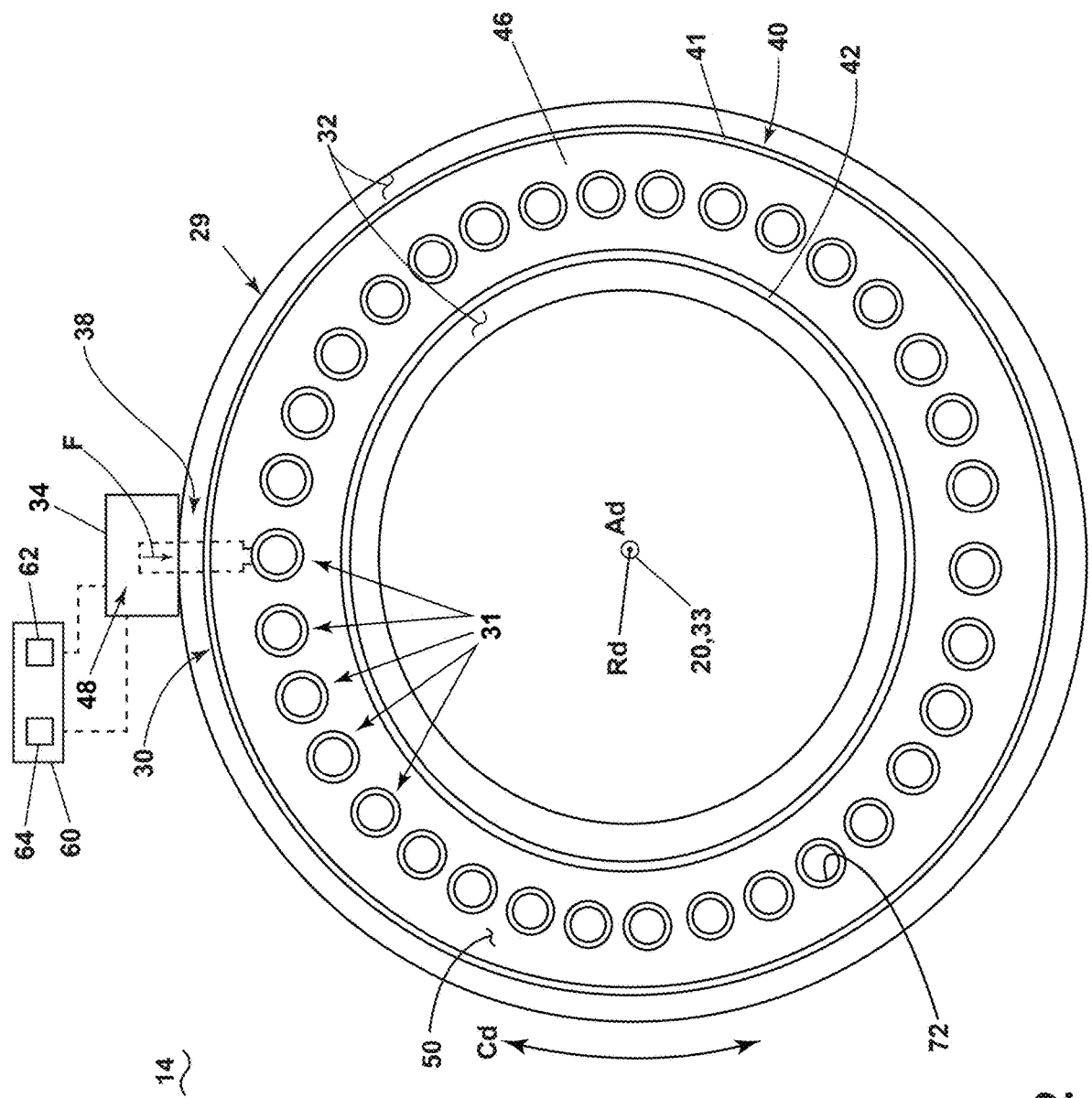
FIG. 2 is a schematic view of the combustion section of FIG. 1 along line II-II in accordance with various aspects described herein.

FIG. 2 depicts a cross-sectional view of the combustion section 14 along line II-II of FIG. 1. The combustor 30 can have a can, can-annular, or annular arrangement depending on the type of engine in which the combustor 30 is located. In a non-limiting example, the combustor 30 can have a combination arrangement located with the engine casing 29. The engine casing 29 can enshroud or cover at least a portion of the combustion section 14. The combustion section 14 includes a combustion section centerline 33. The combustion section 14 can be collinear with the rotational axis 20 such that the combustion section centerline 33 extends along the rotational axis 20. Alternatively, at least a portion of the combustion section centerline 33 can be offset from the rotational axis 20. The combustion section centerline 33 defines a radial direction (Rd), an axial direction (Ad), and a circumferential direction (Cid).

The combustor 30 includes a combustor liner 40. The combustor liner 40 can include an outer combustor liner 41 and an inner combustor liner 42 concentric with respect to each other and arranged in an annular fashion about the engine centerline or rotational axis 20. The combustor liner 40 can have various configurations. As a non-limiting example, the combustor liner 40 can extend continuously about an entirety of a circumferential extent of the combustion section centerline 33 in the circumferential direction (Cid). As a non-limiting example, the combustor liner 40 can extend continuously about less than the entirety of the circumferential extent of the combustion section centerline 33 in the circumferential direction (Cid). As a non-limiting example, the combustor liner 40 can be segmented (e.g., formed of two or more bodies coupled to one another) in the circumferential direction (Cid), the axial direction (Ad), the radial direction (Rd), or a combination thereof. As a non-limiting example, the combustor liner 40 can include two or more circumferential segments, with each segment of the two or more circumferential segments extending circumferentially about less than the entirety of the circumferential extent of the combustion section centerline 33 in the circumferential direction (Cid). The two or more circumferential segments, when coupled to each other, will collectively extend about the entirety of the circumferential extent of the combustion section centerline 33 in the circumferential direction (Cid).

The combustor 30 can include a dome wall 46 interconnecting opposing portions of the combustor liner 40. As a non-limiting example, the dome wall 46 can extend radially between the outer combustor liner 41 and the inner combustor liner 42. The dome wall 46 can be formed substantially perpendicular to the combustion section centerline 33. The dome wall 46, like the combustor liner 40, can extend continuously about an entirety of the circumferential extent of the combustion section centerline 33 in the circumferential direction (Cid). Alternatively, the dome wall 46 can be segmented in the circumferential direction (Cid), the radial direction (Rd), or a combination thereof.

At least one of the dome wall 46 or the combustor liner 40 includes a set of fuel nozzle openings 72. As illustrated, the dome wall 46 includes the set of fuel nozzle openings 72. It will be appreciated, however, that at least one fuel nozzle opening of the set of fuel nozzle openings 72 can be located along a respective portion of the combustor liner 40.

It will be appreciated that in some configurations, the dome wall 46 can be excluded from the combustor 30. In such a configuration, the inner combustor liner 42 and the outer combustor liner 41 can meet at a common point. The dome wall 46 and the combustor liner 40 will be collectively referred to as a "wall" that defines a combustion chamber 50.

The combustor liner 40 and the dome wall 46 (if included) collectively form the combustion chamber 50. The combustion chamber 50 is arranged annularly about the combustion section centerline 33 in the circumferential direction (Cid).

A compressed air passage 32 can be defined at least in part by both the combustor liner 40 and the engine casing 29. As a non-limiting example, the combustor liner 40 is spaced from the engine casing 29 to define the compressed air passage 32 therebetween. The compressed air passage 32 is fluidly coupled to the compressor section 12 (FIG. 1).

The combustion section 14 can include an annular arrangement of combustor portions 31 disposed around the centerline or rotational axis 20 of the turbine engine 10 in the circumferential direction (Cid). It will be appreciated that one or more combustor portions of the annular arrangement of combustor portions 31 can be radially or axially offset in the radial direction (Rd) or axial direction (Ad), respectively. The combustor portions 31 can, in some configurations, include or be configured as combustor cups, fuel cups, or nozzle cups.

Each combustor portion of the annular arrangement of combustor portions 31 includes a fuel nozzle assembly 48. For purposes of illustration, only a singular fuel nozzle assembly 48 is shown, however, it will be appreciated that each combustor portion of the annular arrangement of combustor portions 31 can include a respective fuel nozzle assembly 48. Each fuel nozzle assembly 48 includes a fuel nozzle 38 that extends through a respective one fuel nozzle opening of the set of fuel nozzle openings 72.

During operation, a fuel (F) is fed from the fuel source 34 and to the combustion chamber 50 through the annular array of combustor portions 31. Specifically, the fuel (F) is fed to the combustion chamber 50 through the fuel nozzle 38 of at least one combustor portion of the annular array of combustor portions 31. The fuel (F) includes any suitable fuel, including gaseous fuel, such as H2 fuel. As a non-limiting example, the fuel (F) can include 100% H2 (e.g., without diluents). In some examples, the fuel (F) can be a combination of fuels using other fuels with H2 fuels. For example, the fuel (F) can comprise H2 fuel and methane, such as in the form of natural gas. A controller 60 can be connected to and at least partially control operation of the fuel source 34, the fuel nozzle assembly 48, or both. The controller 60 can include a processor 62 and a memory 64.

Figure 3:
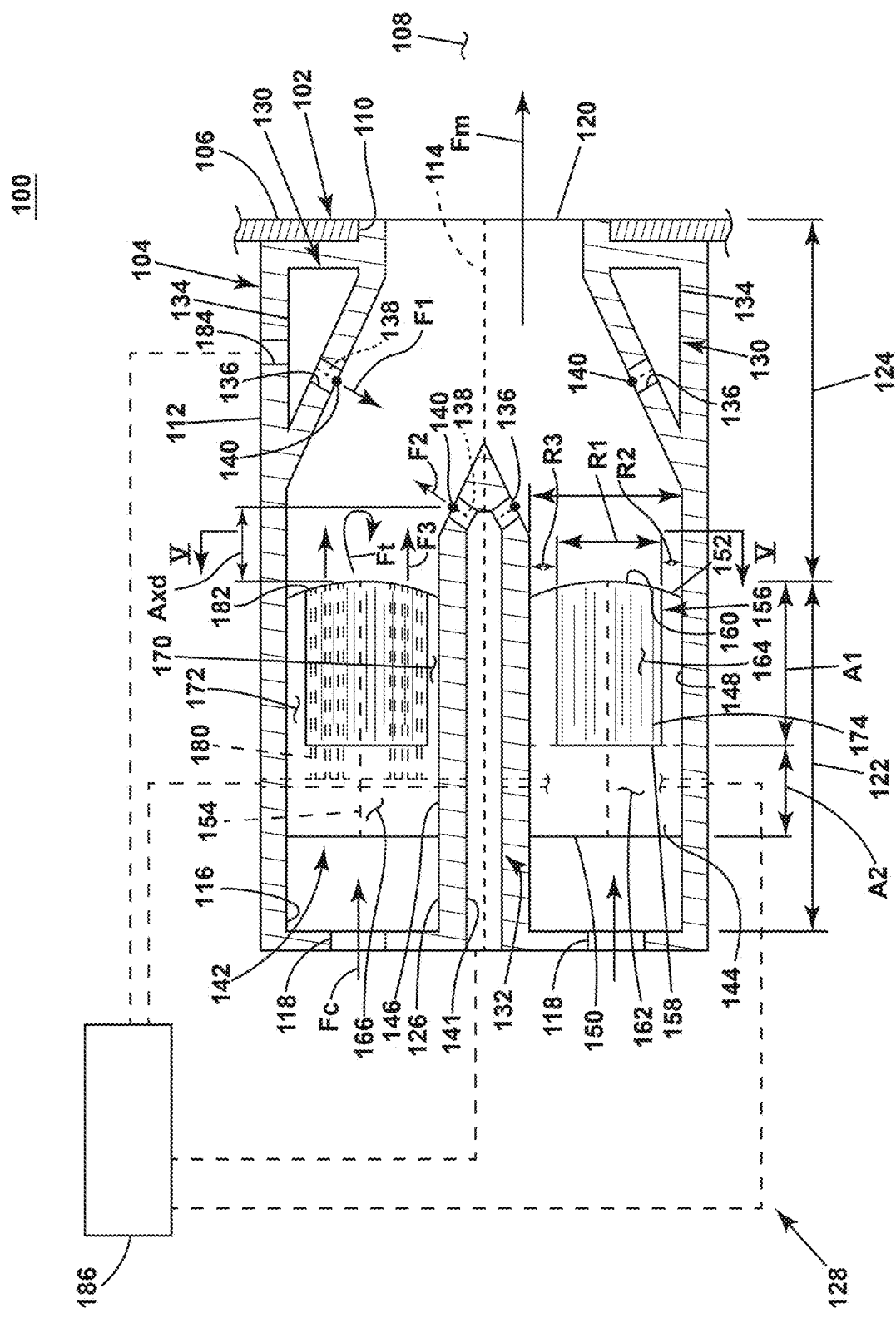
FIG. 3 is a schematic illustration of a combustion section suitable for use within the turbine of FIG. 1, further comprising a fuel nozzle having a set of vanes including a set of lobes in accordance with various aspects described herein.

FIG. 3 is a schematic illustration of a combustion section 100 suitable for use within the turbine 10 of FIG. 1. The combustion section 100 is similar to the combustion section 14 (FIG. 1); therefore, like parts will be identified with like names with it being understood that the description of the combustion section 14 applies to the combustion section 100 unless noted otherwise.

The combustion section 100 includes a combustor 102 and a fuel nozzle 104. The combustor 102 includes a combustor wall 106. The combustor wall 106 includes a fuel nozzle opening 110. The combustor wall 106 at least partially defines a combustion chamber 108. The combustor wall 106 can be various walls within the combustor 102 such as a dome wall (e.g., the dome wall 46 of FIG. 2), a combustor liner (e.g., the combustor liner 40 of FIG. 2, the inner combustor liner 42 of FIG. 2, the outer combustor liner 41 of FIG. 2, or a combination thereof), or a combination thereof that at least partially defines the combustion chamber 108.

The fuel nozzle 104 includes a body 112. The body 112 defines a centerline 114. The body 112 has a central channel 116. The central channel 116 extends between an inlet 118 and an outlet 120. The inlet 118 is formed as at least one of a channel, a slot, a set of holes, or a combination thereof extending through a respective portion of the body 112. The fuel nozzle 104 opens to the combustion chamber 108 at the outlet 120.

The central channel 116 is split into at least two sections; a compressed air flow passage 122 and a mixer 124. The compressed air flow passage 122 extends axially from the inlet 118 and to the mixer 124, with respect to the centerline 114. The mixer 124 extends axially from the compressed air flow passage 122 and to the outlet 120. Further delineation between the compressed air flow passage 122 and the mixer 124 with respect to flows of fluids within the compressed air flow passage 122 and the mixer 124 will be described in further detail below.

The fuel nozzle 104 can include a centerbody 126. The centerbody 126 forms a portion of the body 112 that extends axially into the central channel 116, with respect to the centerline 114. The centerbody 126 can extend axially along a respective portion of the centerline 114.

The fuel nozzle 104 includes a set of vanes 142 located within the central channel 116. Each vane of the set of vanes 142 includes an outer wall 144. The outer wall 144 extends between a root 146 and a tip 148. The tip 148 is located radially outward from the root 146, with respect to the centerline 114. The outer wall 144 extends between a leading edge 150 and a trailing edge 152. The leading edge 150 is located axially forward of the trailing edge 152, with respect to the centerline 114. Each vane of the set of vanes 142 includes a vane centerline 154. The vane centerline 154 extends between the leading edge 150 and the trailing edge 152. The vane centerline 154 extends through the vane and is equidistant between opposing portions of the outer wall 144. The vane centerline 154, as illustrated, is parallel to the centerline 114. Alternatively, the vane centerline 154 can be non-parallel to the centerline 114.

At least a portion of the set of vanes 142 include a respective plurality of lobes 156. As illustrated, both of the shown vanes of the set of vanes 142 include a respective plurality of lobes 156. It will be appreciated that any number of one or more vanes of the set of vanes 142 includes a respective plurality of lobes 156.

Each plurality of lobes 156 defines a waveform 174 located along at least a portion of the outer wall 144 of the vane of the set of vanes 142 that the plurality of lobes 156 is provided along. Each plurality of lobes 156 extends between an upstream end 158 and a downstream end 160. The downstream end 160 is located axially aft of the upstream end 158, with respect to the vane centerline 154 of the vane of the set of vanes 142 that the plurality of lobes 156 is provided along. It will be appreciated that the waveform 174 of each plurality of lobes 156 extends between the upstream end 158 and the downstream end 160.

The upstream end 158 is axially offset from the leading edge 150, with respect to the vane centerline 154. Alternatively, the upstream end 158 can be axially aligned with the leading edge 150, with respect to the vane centerline 154. The downstream end 160 is axially aligned with the trailing edge 152, with respect to the vane centerline 154. Alternatively, the downstream end 160 can be axially offset from the trailing edge 152, with respect to the vane centerline 154. The plurality of lobes 156 can be radially aligned with, radially offset from, or a combination thereof with at least one of the root 146, the tip 148, or a combination thereof, with respect to the vane centerline 154.

The plurality of lobes 156 extend axially between the upstream end 158 and the downstream and 160 a first axial distance (A1), with respect to the vane centerline 154. The first axial distance (A1) is defined as a maximum axial width of the plurality of lobes 156. The plurality of lobes 156 extend radially a first radial distance (R1), with respect to the vane centerline 154. The first radial distance (R1) is defined as a maximum radial width of the plurality of lobes 156.

Each vane of the set of vanes 142 that includes a respective plurality of lobes 156 includes a lobe-present section 164 and can include a lobe-free section 162. The lobe-free section 162 is defined as a region of the outer wall 144 that does not include the waveform 174 of the plurality of lobes 156. The lobe-present section 164 is defined as a region of the outer wall 144 that is defined by the waveform 174 of the plurality of lobes 156. It will be appreciated that the lobe-present section 164 can extend along an entirety of the outer wall 144 such that the vane of the set of vanes 142 including the plurality of lobes 156 does not include a lobe-free section 162.

The lobe-free section 162 can have various formations. As a non-limiting example, the lobe-free section 162 can include an axially forward portion 166, a radially inner portion 170 and a radially outer portion 172. For purposes of illustration, a delineation between the radially inner portion 170 and the axially forward portion 166, and between the radially outer portion 172 and the axially forward portion 166 is illustrated in phantom lines.

The axially forward portion 166 can extend radially between the root 146 and the tip 148. The axially forward portion 166 can be located axially forward of the plurality of lobes 156. As such, the axially forward portion 166 can extend from the leading edge 150 and terminate axially at the upstream end 158. The axially forward portion 166 extends axially a second axial distance (A2), with respect to the vane centerline 154. The second axial distance (A2) is defined as a maximum axial width of the axially forward portion 166. In relation to the first axial distance (A1), the second axial distance (A2) is greater than or equal to 0% and less than or equal to 60% of the first axial distance (A1). The benefit of providing the second axial distance (A2) within the aforementioned range of the first axial distance (A1) is that the plurality of lobes 156 extend greater than or equal to 40% and less than or equal to 100% of an axial extent of the vane that the plurality of lobes 156 are located along. This, in turn, ensures that the plurality of lobes 156 are of sufficient axial length to produce the vortices at a sufficient strength to capture or otherwise mix fluids as described in further detail below.

The radially inner portion 170 is located radially between a radial termination of the plurality of lobes 156 and the root 146, with respect to the vane centerline 154. The radially outer portion 172 is located radially between a radial termination of the plurality of lobes 156 and the tip 148, with respect to the vane centerline 154. The radially inner portion 170 extends radially, with respect to the vane centerline 154, a second radial distance (R2). The second radial distance (R2) is defined as a maximum radial width that the radially inner portion 170 extends, with respect to the vane centerline 154. The radially outer portion 172 extends radially, with respect to the vane centerline 154, a third radial distance (R3). The third radial distance (R3) is defined as a maximum radial width that the radially outer portion 172 extends, with respect to the vane centerline 154. The second radial distance (R2) is greater than, equal to, or less than the third radial distance (R3). The second radial distance (R2) and the third radial distance (R3) can be non-zero. The benefit of having a non-zero second radial distance (R2) and the third radial distance (R3) is that a smooth (e.g., lobe-free area) is formed radially between the plurality of lobes 156 and the body 112, the centerbody 126, or a combination thereof, which will be described in further detail below.

As a non-limiting example, the second radial distance (R2) and the third radial distance (R3) are each greater than or equal to 5% and less than or equal to 200% of the first radial distance (R1). The benefit of placing the second radial distance (R2) and the third radial distance (R3) within the aforementioned range ensures adequate mixing of fuel and compressed air, which will be described in further detail below.

While the lobe-free section 162 is illustrated as including the axially forward portion 166, the radially inner portion 170 and the radially outer portion 172, it will be appreciated that the lobe-free section 162 can include variations of sections. As a non-limiting example, the lobe-free section 162 can be formed without the axially forward portion 166, and the radially inner portion 170, the radially outer portions 172, and the plurality of lobes 156 can extend continuously between the leading edge 150 and the trailing edge 152. As a non-limiting example, the lobe-free section 162 can include an additional section that cuts the plurality of lobes 156 at least one of radially, axially, or a combination thereof apart such that the plurality of lobes 156 includes two or more sections separated by a respective portion of the lobe-free section 162.

The fuel nozzle 104 includes a fuel supply system 128. The fuel supply system 128 includes a fuel source 186. The fuel source 186 is exterior the fuel nozzle 104. The fuel supply system 128 includes a fuel supply formed within the body 112. As a non-limiting example, the fuel supply system 128 can include a body fuel supply 130, a centerbody fuel supply 132, a vane fuel supply 180, or a combination thereof. The body fuel supply 130, the centerbody fuel supply 132, and the vane fuel supply 180 are fluidly coupled to the fuel source 186 by a series of tubes, conduits, passageways, or a combination thereof shown in phantom lines.

The body fuel supply 130 is formed within a portion of the body radially surrounding the central channel 116, with respect to the centerline 114. The body fuel supply 130 can include a fuel body inlet 184 and a fuel manifold 134. The fuel body inlet 184 defines a fluid input to the body fuel supply 130. While only a singular fuel body inlet 184 is illustrated, the fuel nozzle 104 can include any number of one or more fuel body inlets 184. The fuel body inlet 184 is formed as at least one of a slot, a hole, a channel, or a combination thereof formed within the body 112. The fuel manifold 134 is defined as a distribution channel that distributes a fluid received from the fuel body inlet 184. The fuel manifold 134 forms a conduit or passageway within the body 112 and extends circumferentially about at least a portion of the centerline 114. The centerbody fuel supply 132 is formed within a portion of the centerbody 126. The centerbody fuel supply 132 includes a centerbody fuel passage 141.

The body fuel supply 130 and the centerbody fuel supply 132 open to the central channel 116 through a set of fuel orifices 136. The set of fuel orifices 136 are each defined by a passageway, as illustrated, or alternatively a hole formed within and along a respective portion of the body 112 or centerbody 126. Each fuel orifice of the set of fuel orifices 136 defines a fuel orifice centerline 138. Each fuel orifice centerline 138 of the set of fuel orifices 136 intersects a respective fuel orifice of the set of fuel orifices 136 where the respective fuel orifice opens directly to the central channel 116 at a set of midpoints 140.

The vane fuel supply 180 extends through a respective portion of the set of vanes 142. The vane fuel supply 180 opens to the central channel 116 at a set of vane orifices 182. For purposes of illustration, the vane of the set of vanes 142 located on the lower half of the page is shown to include only a section of the vane fuel supply 180. The set of vane orifices 182 can axially coincide with or be axially offset from the trailing edge 152 of a respective vane of the set of vanes 142, with respect to the vane centerline 154 of the respective vane. The set of vane orifices 182 can include any number of one or more orifices along the respective vane. At least a portion of the set of vane orifices 182 are located along the plurality of lobes 156. The vane fuel supply 180 is fluidly coupled to the fuel source 186 through any suitable method. As a non-limiting example, the vane fuel supply 180 can be fluidly coupled to the fuel source 186 through the centerbody fuel passage 141. As a non-limiting example, the vane fuel supply 180 can include a discrete inlet passage fluidly coupled to the fuel source 186. As a non-limiting example, the vane fuel supply 180 can be fluidly coupled to the fuel manifold 134.

As illustrated, the fuel supply system 128 is provided within each of the set of vanes 142, the centerbody 126 and a portion of the body 112 defining an outer perimeter of the central channel 116. However, it will be appreciated that the fuel supply system 128 can be provided within at least one of the set of vanes 142, the centerbody 126, a portion of the body 112 defining an outer perimeter of the central channel 116, or a combination thereof.

The set of vanes 142 are positioned with respect to the set of midpoints 140. Specifically, the farthest downstream portion or otherwise the axially farthest portion from the inlet 118 of each vane of the set of vanes 142 (e.g., the trailing edge 152) is spaced an axial distance (Axd) from an axially nearest midpoint of the set of midpoints 140, with respect to the centerline 114. A relationship between the axial distance (Axd) and the plurality of lobes 156 is used to determine a size of the plurality of lobes 156. This relationship will be described in further detail with relation to FIG. 4, below.

During operation, a compressed air flow (Fc) is fed to the central channel 116. Specifically, the compressed air flow (Fc) is fed to the compressed air flow passage 122 through the inlet 118. As such, it will be appreciated that the compressed air flow passage 122 is defined as a region of the central channel 116 absent a flow of fuel but including the compressed air flow (Fc). The compressed air flow (Fc) is a flow of compressed air from an upstream portion of the turbine engine (e.g., the turbine engine 10 of FIG. 1) such as from a compressor section (e.g., the compressor section 12 of FIG. 1).

The compressed air flow (Fc) flows over the set of vanes 142 and the plurality of lobes 156. As the compressed air flow (Fc) flows over the plurality of lobes 156, the compressed air flow (Fc) forms a turbulent air flow (Ft) in the form of vortices or eddies. For purpose of illustration, the turbulent air flow (Ft) is shown directly downstream of one vane of the set of vanes 142. However, it will be appreciated that each vane of the set of vanes 142, specifically each lobe of the plurality of lobes 156, generates a respective turbulent air flow (Ft).

A first flow of fuel (F1) can be fed to the central channel 116 through the body fuel supply 130. A second flow of fuel (F2) can be fed to the central channel 116 through the centerbody fuel supply 132. A third flow of fuel (F3) can be fed to the central channel 116 through the vane fuel supply 180. At least two of the first flow of fuel (F1), the second flow of fuel (F2), and the third flow of fuel (F3) can be the same type of fuel (e.g., H2 fuel) at a same state (e.g., gaseous). Alternatively, two or more of the first flow of fuel (F1), the second flow of fuel (F2), and the third flow of fuel (F3) can differ. As a non-limiting example, the first flow of fuel (F1) can be liquid H2 fuel, while the second flow of fuel (F2) can be gaseous H2 fuel. As a non-limiting example, at least one fuel of the first flow of fuel (F1), the second flow of fuel (F2), and the third flow of fuel (F3) can be a flow of non-fuel fluid such as, but not limited to, steam. In all cases, however, at least one of the first flow of fuel (F1), the second flow of fuel (F2), and the third flow of fuel (F3) includes a flow of fuel. It will be appreciated that the fuel nozzle 104 can include at least one of the first flow of fuel (F1), the second flow of fuel (F2), the third flow of fuel (F3), or a combination thereof. The fuel fed to the central channel 116 (e.g., the first flow of fuel (F1), the second flow of fuel (F2), and the third flow of fuel (F3)) will hereinafter be collectively referred to as the flow of fuel.

The flow of fuel is fed from the fuel source 186 and to the central channel 116. Specifically, the flow of fuel is fed to the mixer 124 of the central channel 116. As such, the mixer 124 is defined as a region of the central channel 116 that includes both the at least one flow of fuel and the compressed air flow (Fc) (e.g., in the form of the turbulent air flow (Ft)). The flow of fuel is mixed with a respective portion of the compressed air flow (Fc), specifically the turbulent air flow (Ft), to define a mixture of fuel and air (Fm). The mixture of fuel and air (Fm) is fed to the combustion chamber 108 and ignited to define a flame (not illustrated) within the combustion chamber 108.

The flow of fuel contains any suitable fuel. As a non-limiting example, the flow of fuel includes a flow of H2 fuel (e.g., 100% gaseous H2 fuel, 100% liquid H2 fuel, or H2 fuel mixed with another fuel or fluid).

Due to the turbulent air flow (Ft), the mixture of fuel and air (Fm) is formed as a uniform mixture of fuel and air. As used herein, a uniform mixture of fuel and air refers to a flow of fluid containing a fuel and an air in which the fuel is evenly or nearly-evenly spread throughout the flow of air. "Nearly-evenly" refers to instances where small sections of the homogenous mixture of fuel and air includes larger concentrations of fuel or air. It will be appreciated that these small sections are negligible and defined as regions where, once the mixture of fuel and air (Fm) is ignited, will not cause flashback to occur or for a noticeable difference in temperature distribution to occur. It will be appreciated that as used herein the uniform mixture of fuel and air is further defined as a mixture of fuel and air with a uniform, predictable pattern. As a non-limiting example, the uniform mixture of fuel and air can include small pockets of larger concentrations of fuel that are evenly and predictably spread throughout the mixture of fuel and air (Fm). The mixture of fuel and air (Fm), due to the turbulent air flow (Ft) does not include large pockets or concentrations of fuel. The large pockets or concentrations of fuel are defined as areas within a mixture of fuel and air that would cause flashback or a noticeable non-uniform temperature distribution once the mixed flow of mixture of fuel and air (Fm) is ignited.

The fuel nozzle 104 is especially well suited for use where the flow of fuel contains H2 fuel. As discussed herein, the turbulent air flow (Ft) ensures a uniform mixture of fuel and air of the mixture of fuel and air (Fm), thus reducing the likelihood of pockets or concentrations of fuel to be formed within the mixture of fuel and air (Fm). As discussed herein, H2 fuels have a higher burn velocity and greater chance for flashback. The elimination of or reduction of the large concentrations of fuel within the mixture of fuel and air (Fm) reduces the likelihood of flashback occurring by reducing the locations where the flame can spread.

Further, the use of the turbulent air flow (Ft) allows for a lean-fuel mixture of the mixture of fuel and air (Fm). As used herein, the term "lean mixture" refers to a mixture of fuel and air (Fm) with a relatively low concentration or volume of fuel. Conversely, a "rich mixture" refers to a mixture of fuel and air (Fm) with relatively high concentration of volume of fuel. A lean mixture of fuel and air reduces the overall NOx emissions from the turbine engine, however, a lean mixture of fuel and air can be more difficult to control within the combustion chamber 108 in comparison with the rich mixture of fuel and air. Specifically, it is more difficult to create a uniform mixture of fuel and air when using a lean mixture. The use of the turbulent air flow (Ft) ensures that the flow of fuel and the flow of compressed air (Fc) are uniformly or nearly uniformly mixed.

The inclusion of the radially inner portion 170 and the radially outer portion 172 (e.g., the second radial distance (R2) and the third radial distance (R3) are non-zero) helps with decreasing the risk of flashback. This is done by avoiding areas of the mixture of fuel and air (Fm) that have a relatively low velocity compared to the other portions of the mixture of fuel and air (Fm). Specifically, it has been found that positioning the turbulent air flow (Ft) near solid walls (e.g., the body 112, the centerbody 126, etc.) within the central channel 116 causes shear zones of the fluid within the central channel 116. The shear zones are defined as localized regions where a fluid within a first portion of the localized region is moving slower than a fluid within a second portion of the localized region. By providing the radially inner portion 170 and the radially outer portion 172, the turbulent air flow (Ft) is positioned a sufficient distance radially from the solid walls of the fuel nozzle 104, with respect to the centerline. As such, the shear zones are not created, which reduces the risk of flashback. It is contemplated that allowing the shear zones to be created causes pockets of fuel from the mixture of fuel and air (Fm) to form within the fuel nozzle 104, thus increasing the risk of flashback.

Figure 4:
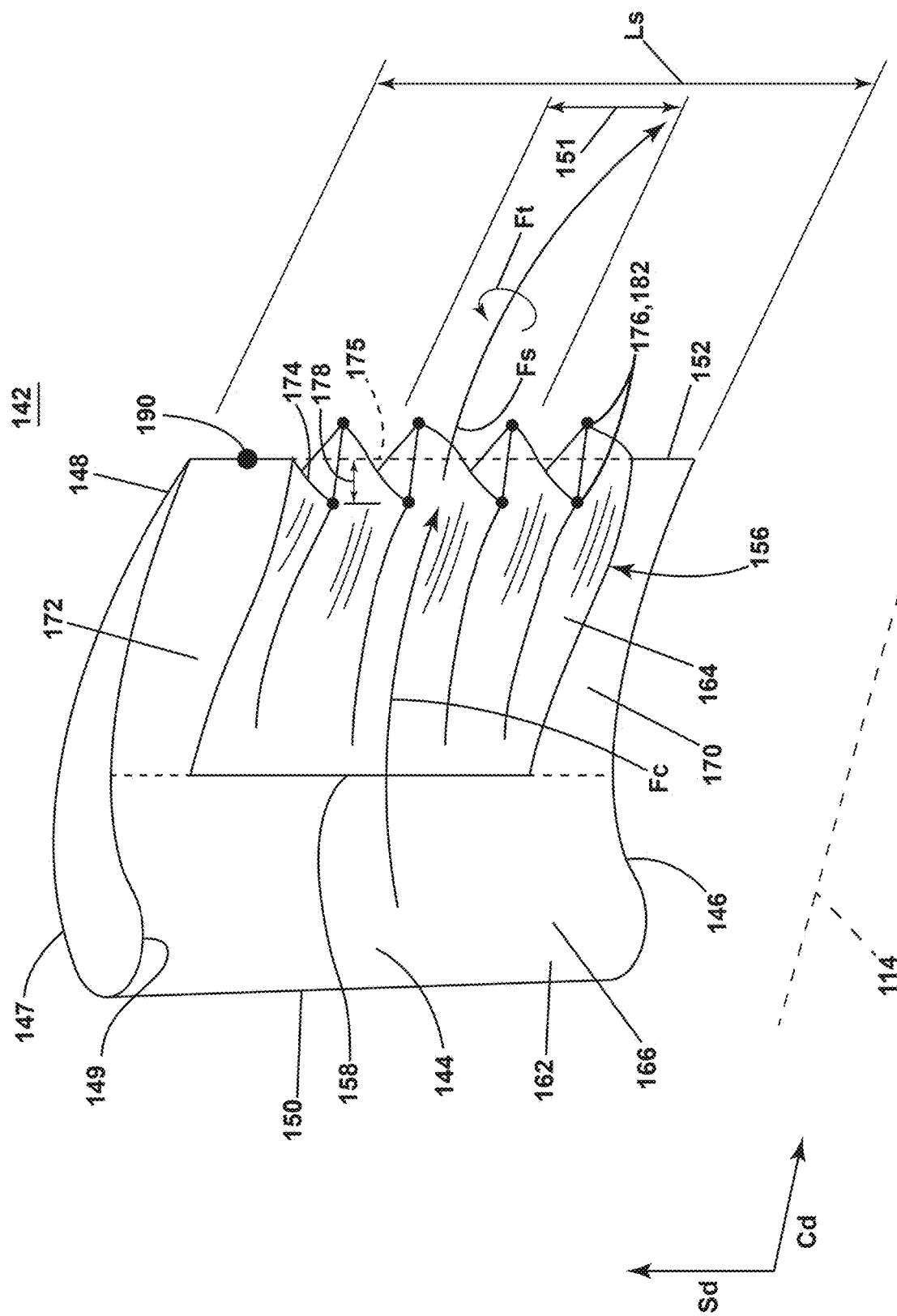
FIG. 4 is a schematic perspective view of a vane of the set of vanes of FIG. 3, further illustrating a waveform of the set of lobes in accordance with various aspects described herein.

FIG. 4 is a schematic perspective view of a vane of the set of vanes 142 of FIG. 3. The outer wall 144 extends between the root 146 and the tip 148 in a spanwise direction (Sd), and between the leading edge 150 and the trailing edge 152 in a chordwise direction (Cd). The vane 142 extends a spanwise length (Ls) along the trailing edge 152 in the spanwise direction (Sd). The outer wall 144 defines a suction side 147 and a pressure side 149. The vane 142 can have an airfoil cross shape, as illustrated, including the suction side 147 and the pressure side 149. Alternatively, the vane 142 can be formed as a non-airfoil shape such as, but not limited to, a linear wall. For purposes of illustration, the centerline 114 of the fuel nozzle 104 (FIG. 3) is shown. It will be appreciated that the set of vane orifices 182 can include a set of offset vane orifices 190 that are offset from the plurality of lobes 156 such as along, for example, the radially inner portion 170, the radially outer portion 172, any other section of the lobe-free section 162, or a combination thereof.

An area of the vane 142 inhabited by the plurality of lobes 156 is quantified as a percentage of the spanwise length (Ls). Specifically, a downstream end of the plurality of lobes 156 (e.g., the portion of the plurality of lobes 156 provided along the trailing edge 152) can be located within a region of the vane 142 that is greater than or equal to 10% and less than or equal to 90% of the spanwise length (Ls) measured along the trailing edge 152. The radially inner portion 170 and the radially outer portion 172 can be expressed as a percentage of the spanwise length (Ls) along the trailing edge 152. Specifically, the radial width (e.g., radial extension with respect to the vane centerline 154 of FIG. 3) of each of the radially inner portion 170 and the radially outer portion 172 at the trailing edge 152 or otherwise at an axially farthest downstream portion of the radially inner portion 170 and the radially outer portion 172 is less than or equal to 10% of the spanwise length (Ls). Put another way, the radial extension of a farthest downstream portion of the plurality of lobes 156 is within an area of the vane 142 spanning from, at least, 10% to 90% of the spanwise length (Ls) measured along the trailing edge 152 with 0% being the root 146 at the trailing edge 152. The benefit of sizing the radially inner portion 170 and the radially outer portion 172 to be less than or equal to 10% each of the spanwise length (Ls) is to avoid areas of fuel that have a relatively low velocity and further to reduce the risk of flashback as discussed herein.

The outer wall 144 includes the plurality of lobes 156, the lobe-free section 162, and the lobe-present section 164. The lobe-free section 162 can include the axially forward portion 166, the radially inner portion 170, and the radially outer portion 172.

The plurality of lobes 156 extend between the upstream end 158 and the downstream end 160. The plurality of lobes 156 include the waveform 174. The waveform 174 includes a plurality of apexes 176 located at the downstream end 160. The waveform 174 includes any number of two or more apexes in the plurality of apexes 176.

Each apex of the plurality of apexes 176 is defined by an amplitude 178 with respect to a midline 175. The midline 175 is defined as a centerline extending transverse the waveform 174 at the downstream end 160. The midline 175 can be an extension of or offset from the trailing edge 152. The amplitude 178 can remain constant in the spanwise direction (Sd). Alternatively, the amplitude 178 can vary along the waveform 174 in the spanwise direction (Sd). As a non-limiting example, the waveform 174 can be sized such that the amplitude 178 increases serially from at least one of the root 146 or the tip 148 and towards an other of the root 146 or the tip 148 in the spanwise direction (Sd). The plurality of lobes 156 increase in amplitude 178 in the chordwise direction (Cd). A location where the amplitude 178 is zero coincides with the upstream end 160.

The plurality of lobes 156 along the vane 142 include a maximum amplitude 178 (e.g., the largest amplitude 178 of the plurality of apexes 176). The maximum amplitude 178 is greater than or equal to 10% and less than or equal to 40% of the spanwise length (Ls). Sizing the maximum amplitude 178 within the aforementioned range allows for sufficient creation of the turbulent air flow (Ft), which will be described in further detail below. As used herein, "sufficient creation" refers to a volumetric flow rate of the turbulent air flow (Ft) that is sufficient to capture and distribute the flow of fuel in order to create the uniform mixture of fuel and air (Fm).

The plurality of apexes 176 have an average of the amplitude 178 of each apex of the plurality of apexes 176 along a given waveform 174. A largest amplitude 178 of the plurality of apexes 176 is greater than or equal to 1.02 times and less than or equal to 2 times the average amplitude. A smallest amplitude 178 of the plurality of apexes 176 is greater than or equal to 0.5 times and less than or equal to 0.98 times the average amplitude. The sizing of the plurality of apexes 176 such that the smallest amplitude and the largest amplitude fall within the aforementioned ranges allows for sufficient creation of the turbulent air flow (Ft), which will be described in further detail below.

The set of vane orifices 182 can be located at the plurality of apexes 176. At least one vane orifice of the set of vane orifices 182 can be offset from the plurality of apexes 176 in the chordwise direction (Cd), spanwise direction (Sd), or a combination thereof. As a non-limiting example, at least one vane orifice of the set of vane orifices 182 can be located along a portion of the trailing edge 152 corresponding to the radially outer section 172, the radially inner section 170, or a combination thereof. As a non-limiting example, at least one vane orifice of the set of vane orifices 182 can be located along a portion of the waveform 174 offset from the plurality of apexes 176.

During operation, the compressed air flow (Fc) flows from the leading edge 150 and towards the trailing edge 152 following the contour of the suction side 147 and the pressure side 149. The contour of the vane 142 can cause the compressed air flow (Fc) to turn and gain a non-zero tangential momentum to define a swirled air flow (Fs) within the central channel 116 (FIG. 3). The swirled airflow (Fs) is quantified by a swirl number of greater than or equal to 0.2 and less than or equal to 1.5. The turbulent air flow (Ft) flows with respect to and within the swirled airflow (Fs).

The benefit of providing the aforementioned ranges of the amplitude 178 (e.g., the smallest amplitude, the largest amplitude, the maximum amplitude) is that the turbulent air flow (Ft) is at a sufficient strength to adequately capture and distribute the at least one flow of fuel (e.g., the first flow of fuel (F1), the second flow fuel (F2), or the third flow of fuel (F3) of FIG. 3) within the mixture of fuel and air (Fm). As discussed herein, the turbulent air flow (Ft) is a localized chaotic airflow. As such, a strength of the turbulent air flow (Ft) can dissipate the further the turbulent air flow (Ft) gets from a source of the turbulent air flow (Ft) (e.g., the plurality of lobes 156).

It is contemplated that the amplitude 178 can be used to determine an amount of turbulence within the turbulent air flow (Ft). Specifically, the amount of turbulence within the turbulent airflow (Ft) increases as the amplitude 178 gets larger. The amplitude 178 of the waveform 174 can be varied radially between the plurality of apexes 176. As a non-limiting example, a first apex of the plurality of apexes 176 can have a first amplitude while a second apex of the plurality of apexes 176 can have a second amplitude, less than the first amplitude. The turbulent air flow (Ft) directly downstream of or otherwise generated by the portion of the waveform 174 defining the first apex will have a larger turbulence than the turbulent air flow (Ft) directly downstream of or otherwise generated by the portion of the waveform 174 defining the second apex.

As a non-limiting example, the waveform 174 can be sized such that the amplitude 178 increases serially from the root 146 and to a midspan area 151. The midspan area 151 is section of the trailing edge 152 that extends within an area of greater than or equal to 35% and less than or equal to 65% in the spanwise direction (Sd) with 0% being where the root 146 meets the trailing edge 152. From the midspan area 151, the amplitude 178 can then serially decrease in size towards the tip 148 in the spanwise direction (Sd). With such a configuration, the turbulent air flow (Ft) will be stronger within the midspan area 151, and weaker outside of the midspan area 151 in the spanwise direction (Sd). Locating the strongest turbulence of the turbulent air flow (Ft) within the midspan area, as discussed herein, limits the possibility of flashback and is especially advantageous for use with H2 fuels. Put another way, locating the apex of the plurality of apexes 176 having the largest amplitude 178 to be within the midspan area 151 limits the possibility of flashback and is especially advantageous for use with H2 fuels.

With reference to FIGS. 3 and 4, the amplitude 178 of the plurality of apexes 176 is further defined in relation to the axial distance (Axd) of FIG. 3. As a non-limiting example, for a given vane of the set of vanes 142 that include the plurality of lobes 156, the axial distance (Axd) is greater than or equal to 0 times and less than 5 times the average amplitude of the plurality of apexes 176 of the plurality of lobes 156. When equal to 0 times the average amplitude of the plurality of apexes 176 of the plurality of lobes 156, it is contemplated that the vane of the set of vanes 142 including the plurality of lobes 156 can include the vane fuel supply 180 with the set of vane orifices 182 being formed along the trailing edge 152. Additionally or alternatively, at least one orifice of the set of fuel orifices 136 of the centerbody fuel supply 132 can be aligned with the trailing edge 152.

The benefit of sizing the axial distance (Axd) within the aforementioned range is the increased capability of the fuel nozzle 104 to form a uniform mixture of fuel and air in the mixture of fuel and air (Fm). Specifically, providing the axial distance (Axd) within the aforementioned range helps ensure that the at least one fuel (e.g., the first flow of fuel (F1), the second flow of fuel (F2), or the third flow of fuel (F3)) is injected into the turbulent airflow (Ft) where the turbulent airflow (Ft) is strong enough to distribute the at least one fuel within the mixture of fuel and air (Fm). Positioning at least a portion of the set of midpoints 140 near the turbulent air flow (Ft) helps ensure that the at least one fuel is injected into the turbulent air flow (Ft) prior to the turbulent air flow (Ft) losing too much of its strength.

Figure 5:
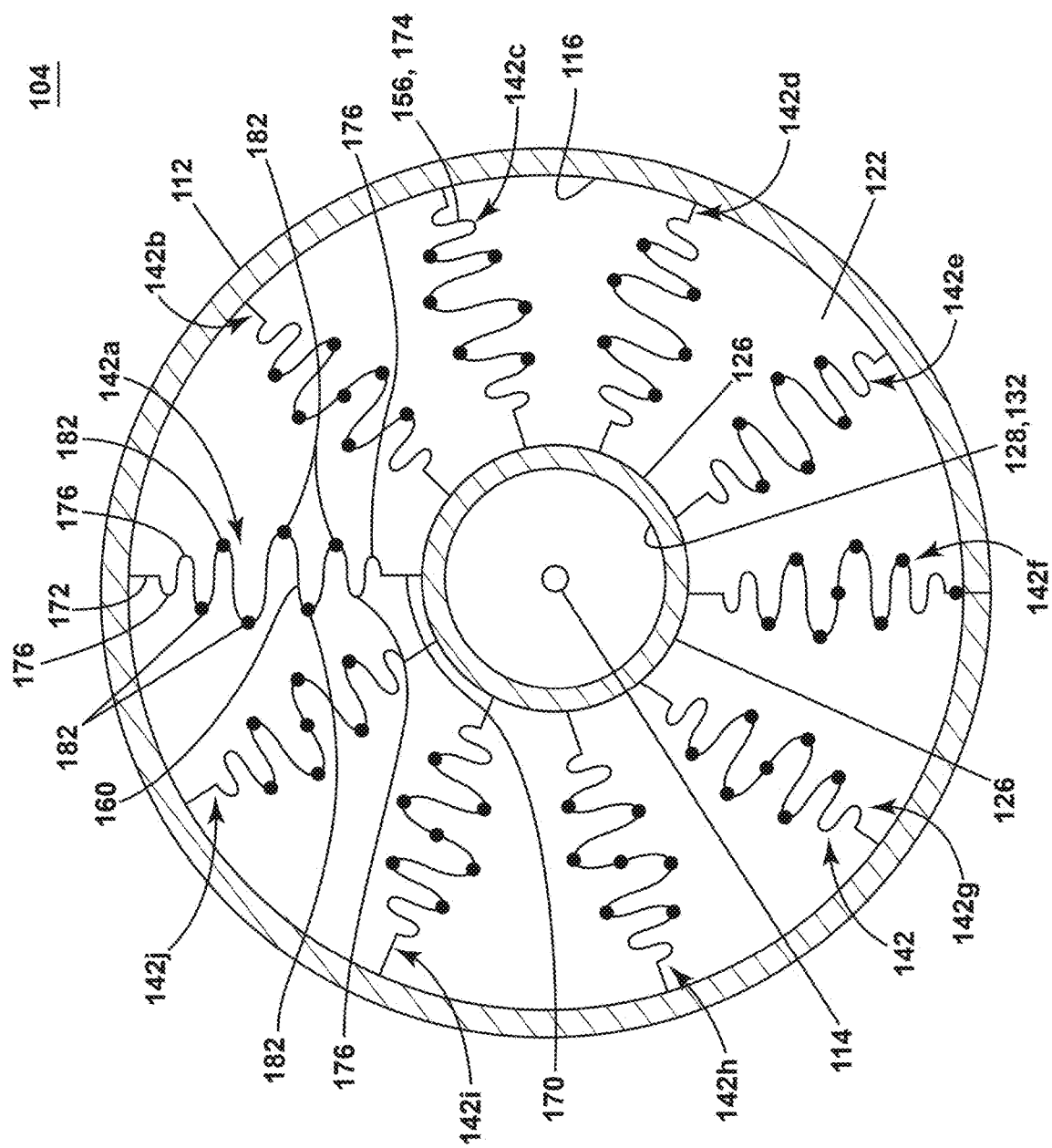
FIG. 5 is a schematic cross-sectional view of the fuel nozzle as seen from sectional-line V-V of FIG. 3, further illustrating a first through tenth vane in accordance with various aspects described herein.

FIG. 5 is a schematic cross-sectional view of the fuel nozzle 104 as seen from sectional-line V-V of FIG. 3. The fuel nozzle 104 includes the body 112 forming the central channel 116 and defining a centerline 114. The central channel 116 has the compressed air flow passage 122. The centerbody 126 can have a portion of the fuel supply system 128, specifically the centerbody fuel supply 132. At least a portion of the set of vanes 142 have the plurality of lobes 156. The plurality of lobes 156 include the waveform 174 with the plurality of apexes 176. The fuel supply system 128 can include the set of vane orifices 182 located along the downstream end 160. At least a portion of the set of vanes 142 can include the radially inner portion 170 and the radially outer portion 172.

The set of vanes 142 include any number of one or more vanes circumferentially spaced within the central channel 116 about the centerline 114. As a non-limiting example, the set of vanes 142 include a first vane 142a, a second vane 142b, a third vane 142c, a fourth vane 142d, a fifth vane 142e, a sixth vane 142f, a seventh vane 142g, an eighth vane 142h, a ninth vane 142i, and a tenth vane 142j. As illustrated, each of the first through-tenth vane 142a-j includes a respective plurality of lobes 156. It will be appreciated, however, that only a portion of the first through-tenth vanes 142a-j can include a respective plurality of lobes 156. As a non-limiting example, every other vane of the set of vanes 142 (e.g., the first vane 142a, the third vane 142c, the fifth vane 142e, the seventh vane 142g, and the ninth vane 142i) can include a respective plurality of lobes 156. As a non-limiting example, a radial half, with respect to the centerline 114, can include a respective plurality of lobes 156 (e.g., the first vane 142a, the second vane 142b, the third vane 142c, the fourth vane 142d, and the fifth vane 142e include a respective plurality of lobes 156). As a non-limiting example, two adjacent vanes of the set of vanes 142 can include a respective plurality of lobes 156, while a next two adjacent vanes of the set of vanes 142 do not include a respective plurality of lobes 156 (e.g., the first vane 142a, the second vane 142b include a respective plurality of lobes 156 while the third vane 142c and the fourth vane 142d do not include a respective plurality of lobes 156). The aforementioned non-limiting examples are examples only. It will be appreciated the set of vanes 142 can have any suitable arrangement where at least one vane of the set of vanes 142 includes a respective plurality of lobes 156. The variation of the arrangement of the set of vanes 142 can be made to vary where the turbulent airflow (Ft) of FIG. 3 is present and where the turbulent air flow (Ft) is not present.

The set of vane orifices 182 can have various configurations with respect to the plurality of apexes 176. As a non-limiting example, every apex of the plurality of apexes 176, every other apex of the plurality of apexes 176, every third apex of the plurality of apexes 176, or any other configuration is possible. Further, it is contemplated that the set of vane orifices 182 can be located on every vane of the set of vanes 142, every other vane of the set of vanes 142, every third vane of the set of vanes 142, or any other configuration is possible.

Figure 6:
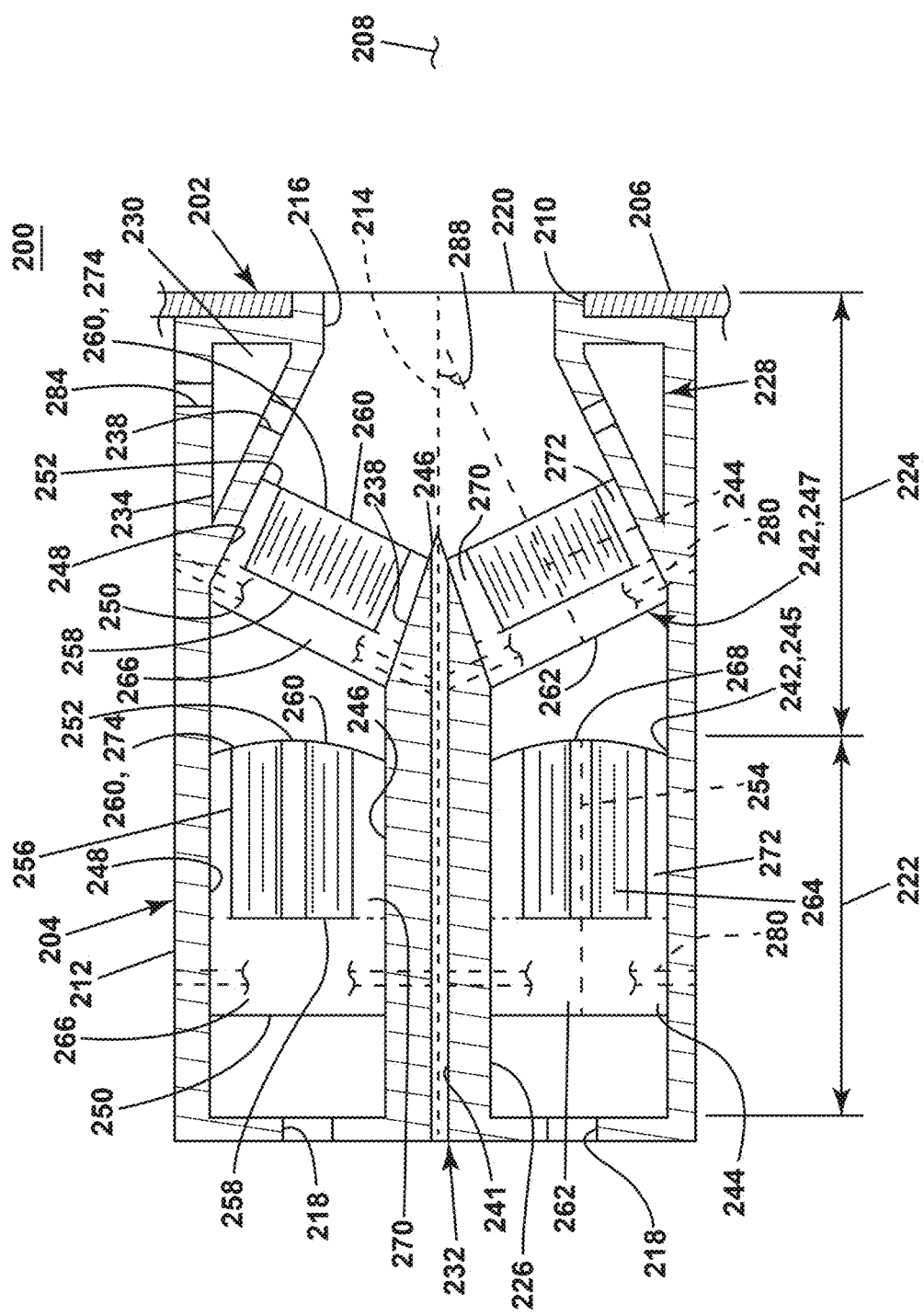
FIG. 6 is a schematic illustration of an exemplary combustion section suitable for use within the combustion section of FIG. 3, further comprising a fuel nozzle having a first group of vanes, a second group of vanes, and a set of lobes in accordance with various aspects described herein.

FIG. 6 is a schematic illustration of an exemplary combustion section 200 suitable for use as the combustion section 100 of FIG. 3. The combustion section 200 is similar to the combustion section 100; therefore, like parts will be identified with like numerals increased to the 200 series with it being understood the description of the combustion section 100 applies to the combustion section 200 unless noted otherwise.

The combustion section 200 includes a combustor 202 and a fuel nozzle 204. The combustor 202 includes a wall 206 at least partially defining a combustion chamber 208 and having a fuel nozzle opening 210. The fuel nozzle 204 has a body 212 defining a centerline 214 and having a central channel 216. The central channel 216 extends between an inlet 218 and an outlet 220. The central channel 216 is split into a compressed air passage 222 and a mixer 224. The fuel nozzle 204 can include a centerbody 226. The fuel nozzle 204 includes a fuel supply system 228. The fuel supply system 228 includes at least one of a body fuel supply 230, a centerbody fuel supply 232, a vane fuel supply 280, or a combination thereof. The body fuel supply 230 can include a fuel manifold 234 and a fuel body inlet 284. The centerbody fuel supply 232 can include a centerbody fuel passage 241. The body fuel supply 230 and the centerbody fuel supply 232 open to the central channel 216 at a set of fuel orifices 238.

The fuel nozzle 204 includes a set of vanes 242. Each vane of the set of vanes 242 includes an outer wall 244 extending between a root 246 and a tip 248, and between a leading edge 250 and a trailing edge 252. Each vane of the set of vanes 242 defines a vane centerline 254. At least a portion of the set of vanes 242 include a plurality of lobes 256. Each of the plurality of lobes 256 extends between an upstream end 258 and downstream end 260. Each vane of the set of vanes 242 that includes a respective plurality of lobes 256 includes a lobe-present section 264 and can include a lobe-free section 262. The lobe-free section 262 can include an axially forward portion 266, a radially inner portion 270, and a radially outer portion 272. The plurality of lobes 256 are defined by a waveform 274 at the downstream end 260.

The fuel nozzle 204 is similar to the fuel nozzle 104 (FIG. 3) in that the fuel nozzle 204 includes the set of vanes 242. However, the set of vanes 242 includes a first group of vanes 245 and a second group of vanes 247. The first group of vanes 245 is spaced axially forward of the second group of vanes 247, with respect to the centerline 214.

At least a portion of both the first group of vanes 245 and the second group of vanes 247 can be formed with a respective plurality of lobes 256. The formation of the plurality of lobes 256 can differ between the first group of vanes 245 and the second group of vanes 247. As a non-limiting example, the lobe-free section 262 of the first group of vanes 245 can include an intermediate section 268 located radially between the radially inner portion 270 and the radially outer portion 272, with respect to the vane centerline 254. The intermediate section 268 splits the plurality of lobes 256 along the respective vane of the first group of vanes 245 into two.

The first group of vanes 245 can include the vane fuel supply 280. As such, during operation a fuel (e.g., the fuel (F) of FIG. 3) can be exhausted from the first group of vanes 245 and towards the second group of vanes 247. As the fuel can be exhausted upstream of a location of where the second group of vanes 247 are located within the central channel 216, it will be appreciated that the second group of vanes 247 can be located within the mixer 224. It will be appreciated that the set of vanes 242, including at least one group of vanes located within the mixer 224, can increase the mixing efficiency of the fuel nozzle 204, which will be described in further detail below. While only the first group of vanes 245 and the second group of vanes 247 are illustrated, it will be appreciated that the set of vanes 242 may include any number of two or more groups of vanes.

The vane centerline 254 at the trailing edge 252 for at least one vane of the set of vanes 242 forms a vane angle 288, with respect to the centerline 214, that is non-zero. Put another way, the at least one vane is oriented such that the vane centerline 254 of the at least one vane is non-parallel to the centerline 214 at the trailing edge 252 of the at least one vane. The vane angle 288 has an absolute value of greater than 10 degrees and less than or equal to 60 degrees. It will be appreciated that providing the vane angle 288 within the aforementioned range reduces the mixing length of the fuel nozzle 204, and therefore reduces the possibility of flashback. As used herein, the mixing length refers to the axial length of the mixer 224 with respect to the centerline 214. Reducing the total area or length of the mixer 224 reduces the space available for pockets of fuel to form within the fuel nozzle 204. Reducing the pockets of fuel within the fuel nozzle 204, in turn, reduces the possibility of flashback from occurring.

The benefit of having multiple groups of vanes is increased turbulence within the central channel 216. Put another way, each group of vanes generates at least one of a swirled air flow (e.g., the swirled air flow (Fs) of FIG. 4), a turbulent air flow (e.g., the turbulent air flow (Ft) of FIG. 3). The more swirls within the central channel 216, the more the compressed air flow (e.g., the compressed air flow (Fc) of FIG. 3) swirls and the more turbulence created within the central channel 216. It is contemplated that the higher turbulence, the easier it is to create the uniform mixture of fuel and air. The benefit of putting at least one group of vanes of the set of vanes 242 within the mixer 224 is that a fluid containing a fluid flows over a respective group of vanes of the set of vanes 242. This, in turn, means that the turbulent fluid flow that flows of the respective group of vanes inherently includes the fuel, thereby increasing the mixing efficiency of the set of vanes 242.

Figure 7:
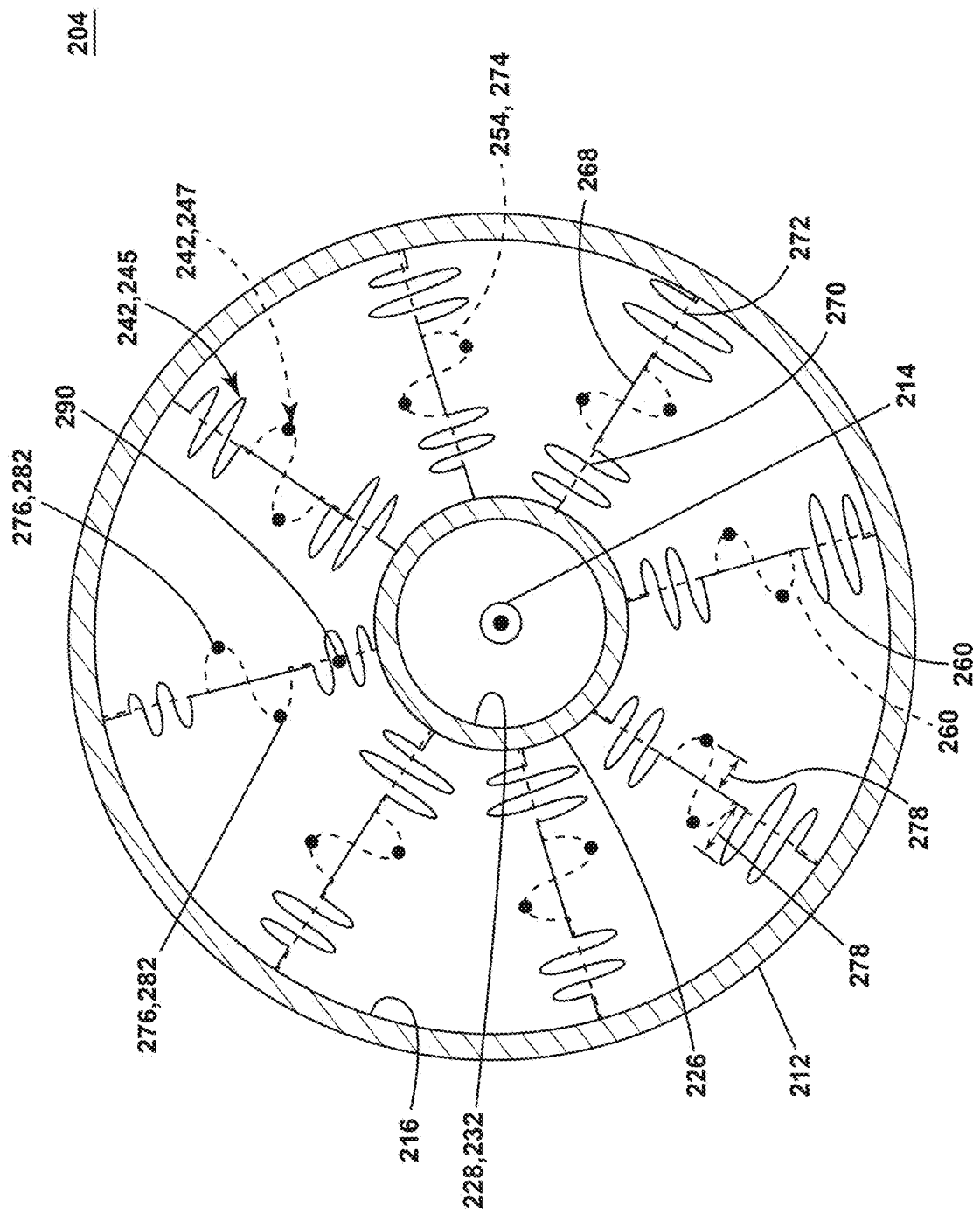
FIG. 7 is a schematic cross-sectional forward looking aft view of the fuel nozzle of FIG. 6, further illustrating a circumferential arrangement of the first group of vanes and the second group of vanes in accordance with various aspects described herein.

FIG. 7 is a schematic cross-sectional forward looking aft view of the fuel nozzle 204 of FIG. 6. For purposes of illustration, the first group of vanes 245 is shown in solid lines while the second group of vanes 247 is shown in dashed lines.

The fuel nozzle 204 includes the body 212 forming the central channel 216 and defining the centerline 214. The centerbody 226 can have a portion of the fuel supply system 228, specifically the centerbody fuel supply 232. At least a portion of the set of vanes 242 have the plurality of lobes 256. The plurality of lobes 256 include the waveform 274 with a plurality of apexes 276. Each apex of the plurality of apexes 276 is defined by an amplitude 278. The fuel supply system 228 can include the set of vane orifices 282 located along the downstream end 260. At least a portion of the set of vanes 242 can include the radially inner portion 270 and the radially outer portion 272. The set of vane orifices 282 can include at least one offset vane orifice 290.

The first group of vanes 245 can be circumferentially aligned with the second group of vanes 247, with respect to the centerline 214. A total number of lobes per plurality of lobes 256 (e.g., a total number of apexes of the plurality of apexes 276) varies between each vane of the first group of vanes 245 and each vane of the second group of vanes 247. Alternatively, the total number of lobes per plurality of lobes 256 (e.g., the total number of apexes of the plurality of apexes 276) can be equal between each vane of the first group of vanes 245 and each vane of the second group of vanes 247. The amplitude 278 (e.g., the smallest amplitude, the largest amplitude, the average amplitude, a single amplitude, etc.) varies between each vane of the first group of vanes 245 and each vane of the second group of vanes 247. Alternatively, amplitude 278 (e.g., the smallest amplitude, the largest amplitude, the average amplitude, a single amplitude, etc.) can remain constant between each vane of the first group of vanes 245 and each vane of the second group of vanes 247.

The set of vane orifices 282 on the second group of vanes 247 can be radially aligned with the intermediate section 268 of the first group of vanes 245. The radial alignment of the set of vane orifices 282 on the second group of vanes 247 with the intermediate section 268 is done to ensure equal distribution of fuel within the mixture of fuel and air (e.g., the mixture of fuel and air (Fm) of FIG. 3).

Figure 8:
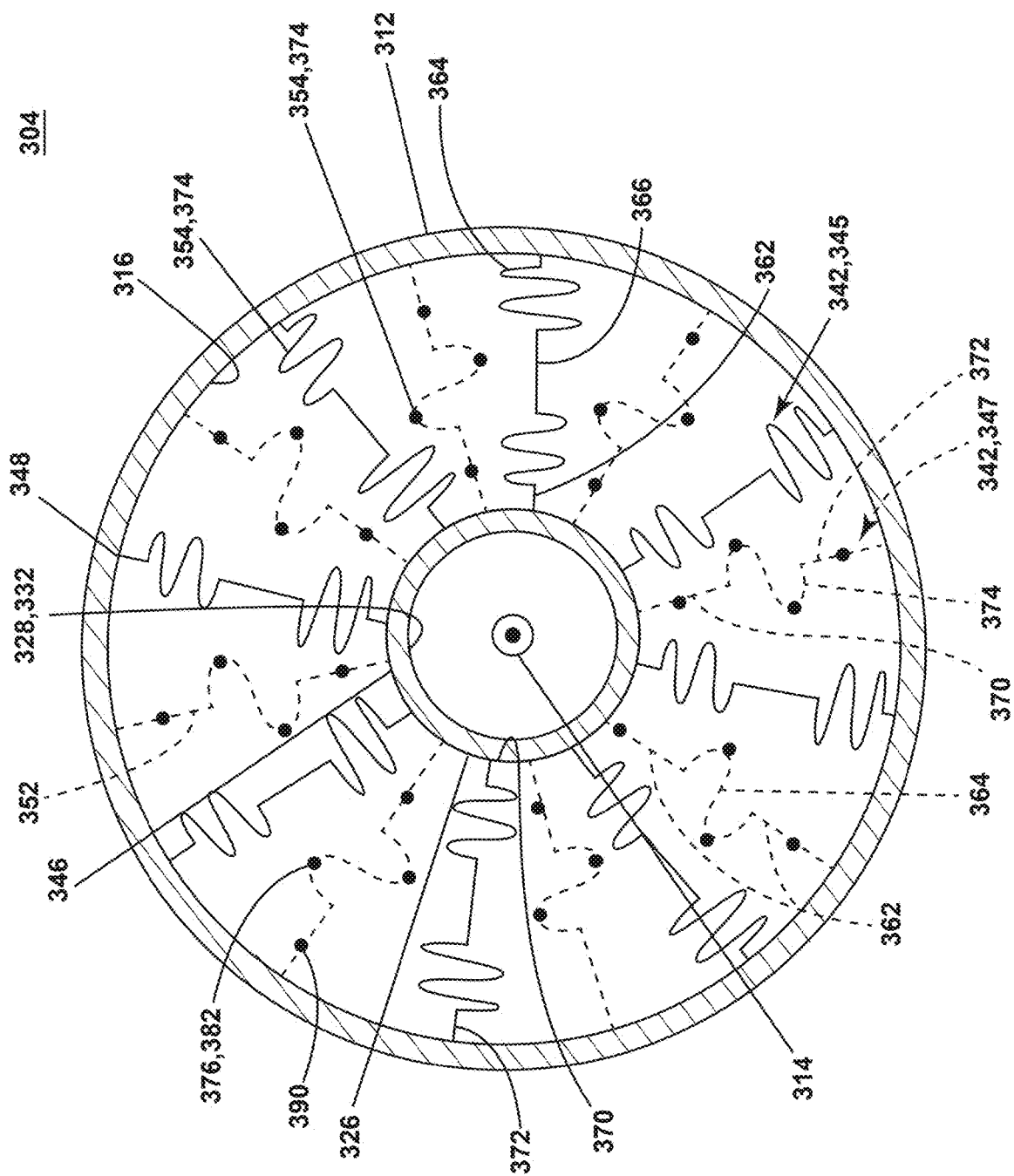
FIG. 8 is a schematic cross-sectional forward looking aft view an exemplary fuel nozzle suitable for use as the fuel nozzle of FIG. 3, further illustrating a circumferential arrangement of a first group of vanes and a second group of vanes, with the first group of vanes being circumferentially offset from the second group of vanes in accordance with various aspects described herein.

FIG. 8 is a schematic cross-sectional forward looking aft view an exemplary fuel nozzle 304 suitable for use as the fuel nozzle 104 of FIG. 3. The fuel nozzle 304 is similar to the fuel nozzle 104 (FIG. 5), 204 (FIG. 7), therefore, like parts will be identified with like numerals increased to the 300 series with it being understood that the description of the fuel nozzle 104, 204 applies to the fuel nozzle 304 unless noted otherwise.

The fuel nozzle 304 includes a body 312 forming a central channel 316 and defining a centerline 314. The fuel nozzle 304 can include a centerbody 326. The centerbody 326 can have a portion of a fuel supply system 328, specifically a centerbody fuel supply 332. The fuel nozzle 304 can include a set of vanes 342. At least a portion of the set of vanes 342 have a respective plurality of lobes 354. The plurality of lobes 354 include a waveform 374 with a plurality of apexes 376. The fuel supply system 328 can include a set of vane orifices 382 located along a respective portion of the set of vanes 342. The set of vane orifices 382 can be formed along the plurality of lobes 354. The set of vane orifices 382 can include at least one offset vane orifice 390 that is spaced from the plurality of lobes 354. At least a portion of the set of vanes 342 can include a lobe-free section 362 and a lobe-present section 364. The lobe-free section 362 can include a radially inner portion 370 and a radially outer portion 372. Each vane of the set of vanes 342 extends between a leading edge (not illustrated, e.g., the leading edge 150 of FIG. 3) and a trailing edge 352, and between a root 346 and a tip 348.

The fuel nozzle 304, like the fuel nozzle 204 (FIG. 5), includes the set of vanes 342 having a first group of vanes 345 and a second group of vanes 347. For purposes of illustration, the first group of vanes 345 is shown in solid lines while the second group of vanes 347 is shown in dashed lines. The first group of vanes 345, however, is circumferentially offset from the second group of vanes 347, with respect to the centerline 314. The first group of vanes 345 can be axially forward of the second group of vanes 347 (e.g., like the first group of vanes 245 and the second group of vanes 247 of FIG. 7), with respect to the centerline 314. Alternatively, the first group of vanes 345 can be axially aligned with, but circumferentially spaced from of the second group of vanes 347, with respect to the centerline 314. The first group of vanes 345, like the first group of vanes 245 (FIG. 7), can include an intermediate portion 366 provided along a respective portion of the lobe-free section 362.

The first group of vanes 345 can be arranged in various patterns with respect to the second group of vanes 347. As a non-limiting example, every other vane of the set of vanes 342 can be a vane from the first group of vanes 345. Put another way, each vane of the first group of vanes 345 can be circumferentially surrounded by two vanes of the second group of vanes 347.

Only a portion of the set of vanes 342 includes a respective portion of the set of vane orifices 382. As a non-limiting example, only the second group of vanes 347 are formed with the set of vane orifices 382.

It is contemplated that locating the set of vane orifices 382 along only a portion of the set of vanes 342 is advantageous when the first group of vanes 345 is axially spaced from the second group of vanes 347. Specifically, in the given example of the fuel nozzle 304, the second group of vanes 347 can be located downstream of the first group of vanes 345. During operation, a first portion of a turbulent air flow (e.g., the turbulent air flow (Ft) of FIG. 3) is generated by the first group of vanes 345 and flows over and/or between the second group of vanes 347. A second portion of the turbulent airflow is then generated by the second group of vanes 347. Locating the set of vane orifices 382 along the second group of vanes 347 means that a flow of fuel (e.g., the third flow of fuel (F3) of FIG. 3) is injected into a region of the central channel 316 including both the first portion and the second portion of the turbulent air flow. Put another way, the flow of fuel exhausted from the set of vane orifices 382 is injected into a region of the central channel 316 with the strongest turbulent air flow, thus increasing the mixing capabilities of the fuel nozzle 304.

The benefit of having the first group of vanes 345 circumferentially spaced form the second group of vanes 347 is that a fewer number of vanes are needed to sufficiently cover the central channel 316 with a turbulent airflow in relation to the fuel nozzle 204 of FIG. 5. Specifically, the first group of vanes 345 can be spaced within circumferential gaps between circumferentially adjacent vanes of the second group of vanes 347. Reducing a total number of vanes of the set of vanes 342 reduces the weight of the fuel nozzle 304 and the material needed to form the fuel nozzle 304, thus increasing the overall efficiency of a turbine engine (e.g., the turbine engine 10 of FIG. 1) including the fuel nozzle 304.

It is contemplated that an increased turbulence with respect to the fuel nozzle 104 of FIG. 3 is experienced within the fuel nozzle 304 when the first group of vanes 345 are at least partially axially offset from the second group of vanes 347. It will be appreciated that "at least partially axially offset" refers to at least each trailing edge 352 of the first group of vanes 345 is axially offset from each trailing edge 352 of the second group of vanes 347, with respect to the centerline 314. As a non-limiting example, the first group of vanes 345 can be axially forward of the second group of vanes 347. As such, the turbulent air flow produced by the first group of vanes 345 flows circumferentially between circumferentially opposing vanes of the second group of vanes 347. At least a portion of the turbulent air flow from the first group of vanes 345 can flow against the second group of vanes 347 and flow along the plurality of lobes 354 of the second group of vanes 347. This configuration increases the overall turbulence of the fluid within the central channel 316 in relation to a fuel nozzle that does not include the axially offset groups of vanes.

Figure 9:
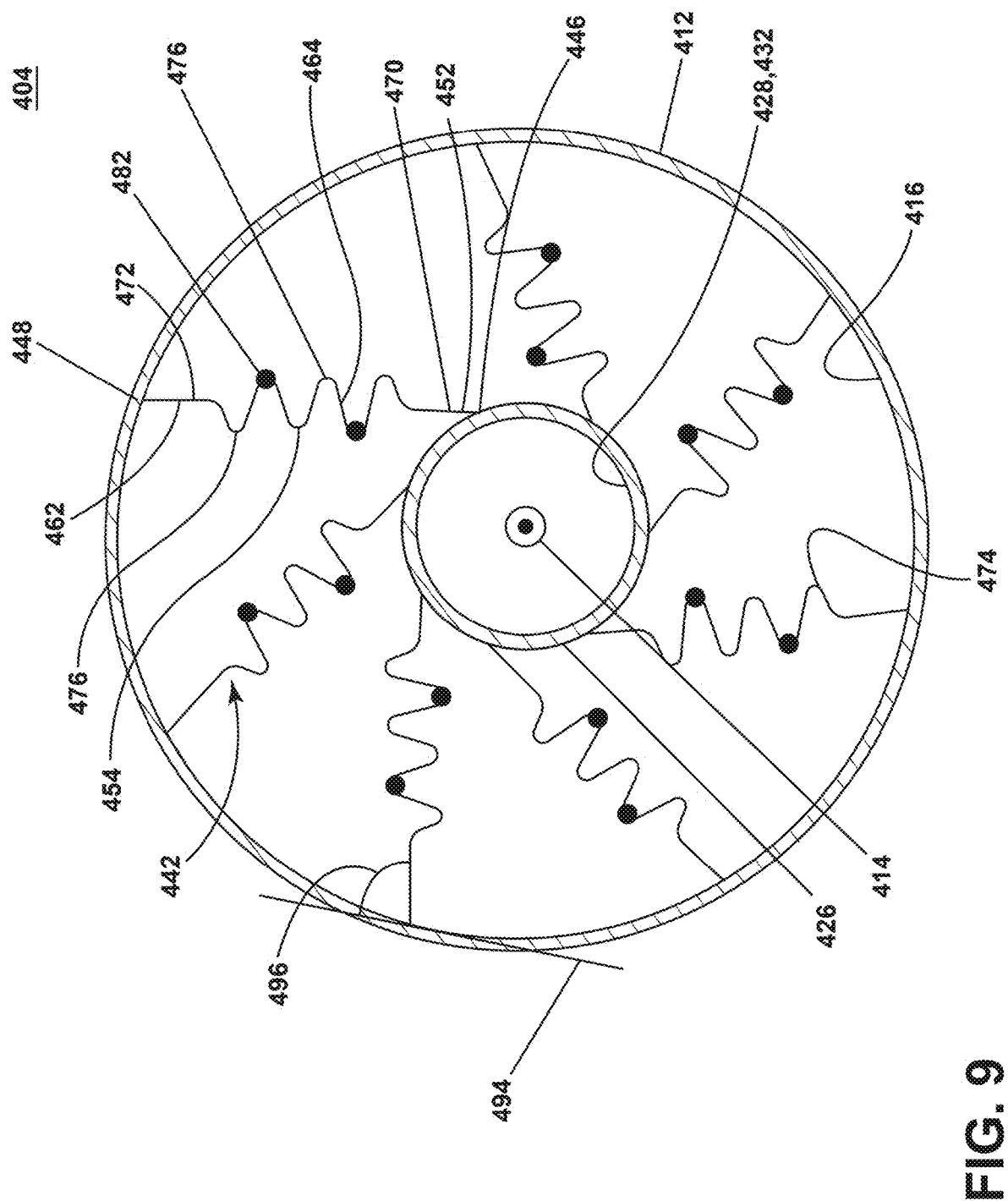
FIG. 9 is a schematic cross-sectional forward looking aft view an exemplary fuel nozzle suitable for use as the fuel nozzle of FIG. 3, further illustrating a set of vanes extending at an extension angle in accordance with various aspects described herein.

FIG. 9 is a schematic cross-sectional forward looking aft view an exemplary fuel nozzle 404 suitable for use as the fuel nozzle of FIG. 3. The fuel nozzle 404 is similar to the fuel nozzle 104 (FIG. 5), 204 (FIG. 7), 304 (FIG. 8), therefore, like parts will be identified with like numerals increased to the 400 series with it being understood that the description of the fuel nozzle 104, 204, 304 applies to the fuel nozzle 404 unless noted otherwise.

The fuel nozzle 404 includes a body 412 forming a central channel 416 and defining a centerline 414. The fuel nozzle 404 can include a centerbody 426. The centerbody 426 can have a portion of a fuel supply system 428, specifically a centerbody fuel supply 432. The fuel nozzle 404 can include a set of vanes 442. At least a portion of the set of vanes 442 have a respective plurality of lobes 454. The plurality of lobes 454 include a waveform 474 with a plurality of apexes 476. The fuel supply system 428 can include a set of vane orifices 482 located along a respective portion of the set of vanes 442. The set of vane orifices 482 can be formed along the plurality of lobes 454. At least a portion of the set of vanes 442 can include a lobe-free section 462 and a lobe-present section 464. The lobe-free section 462 can include a radially inner portion 470 and a radially outer portion 472. Each vane of the set of vanes 442 extends between a leading edge (not illustrated, e.g., the leading edge 150 of FIG. 3) and a trailing edge 452, and between a root 446 and a tip 448.

The fuel nozzle 404, like the fuel nozzle 104 (FIG. 3), 204 (FIG. 5), 304 (FIG. 8), includes the set of vanes 442. At least a portion of the set of vanes 442, however, include have a respective root 446 that is circumferentially offset from a receptive tip 448. The root 446 of a respective vane of the set of vanes 442 can be circumferentially offset in a clockwise direction, with respect to the centerline 414, from the tip 448 of the respective vane, as illustrated. Alternatively, the root 446 of the respective vane of the set of vanes 442 can be circumferentially offset in a counterclockwise direction, with respect to the centerline 414, from the tip 448 of the respective vane.

Each vane of the set of vanes 442 forms an included extension angle 496 with respect to a tangent line 494. The tangent line 494 is defined as a local tangent line of the body 412 where the trailing edge 452 and the tip 448 of the vane intersects the body 412. The included extension angle 496 is taken with respect to the trailing edge 452 where the trailing edge 452 intersects the tip 448. The included extension angle 496 has an absolute value of greater than 0 degrees and less than 90 degrees. As a non-limiting example, the included extension angle 496 can have an absolute value of greater than or equal to 10 degrees and less than or equal to 90 degrees. It will be appreciated that while the set of vanes 442 extend in a counterclockwise direction from the root 446 and to the tip 448, that the set of vanes 442 can alternatively extend clockwise from the root 446 and to the tip 448.

The benefit of having the included extension angle 496 within the aforementioned range is that a greater area circumferential extent of the central channel 416 can be covered by the set of vanes 442, in comparison with a fuel nozzle that has a 90 degree included extension angle 496. It will be appreciated that the included extension angle 496 can be sized such that the tip 448 of a first vane of the set of vanes 442 circumferentially overlies or is provided circumferentially beyond the root 446 of a second vane of the set of vanes 442 that is circumferentially adjacent the first vane. When being provided circumferentially beyond the root of the second vane, the trailing edge 452 of the first vane circumferentially overlies the root 446 of the second vane. With this configuration (e.g., the tip 448 of the first vane circumferentially overlies or is provided circumferentially beyond the root 446 of the second vane), the total circumferential extent that the set of vanes 442 extend within the central channel can be 360 degrees, with respect to the centerline 414.

Figure 10:
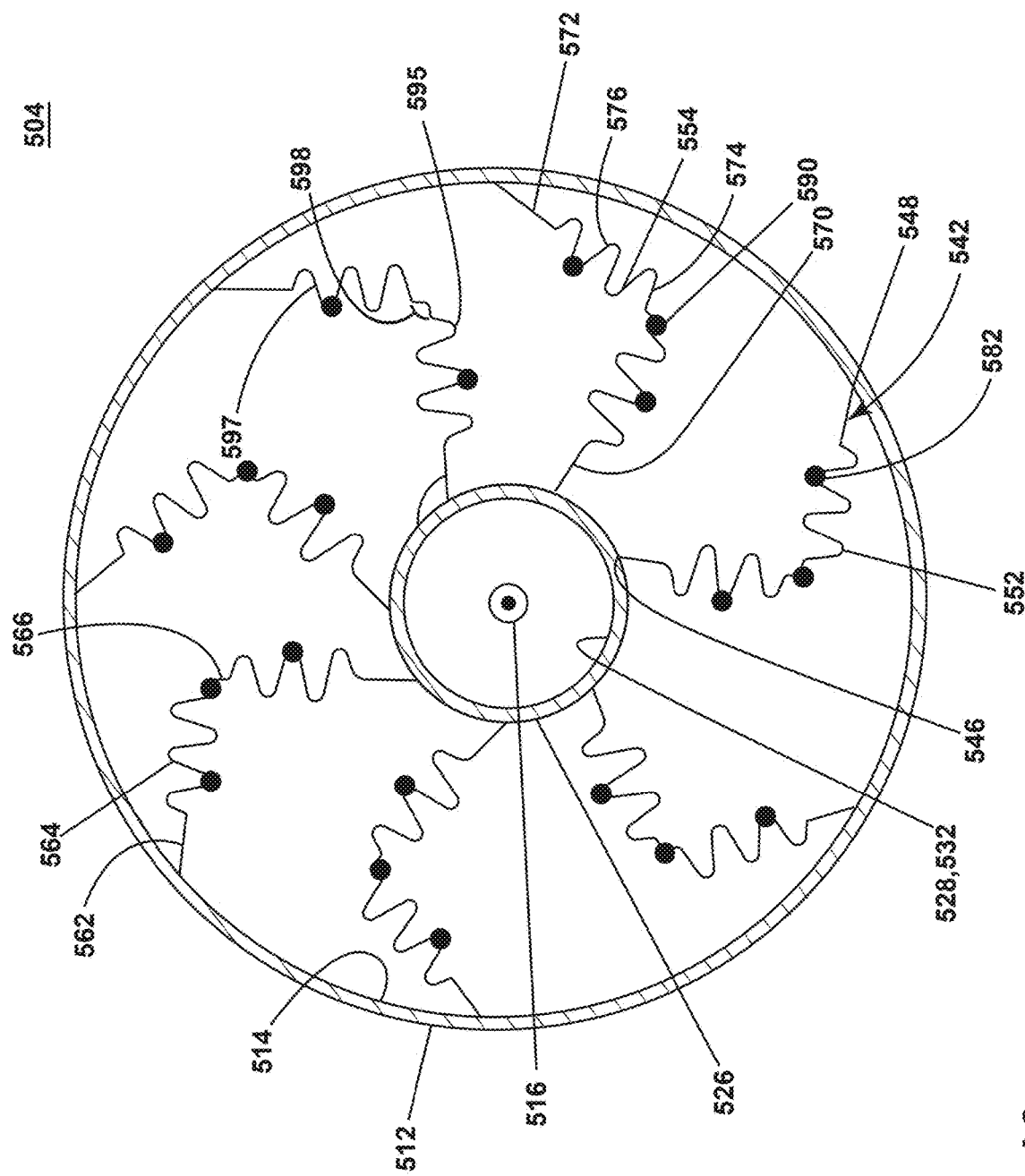
FIG. 10 is a schematic cross-sectional forward looking aft view an exemplary fuel nozzle suitable for use as the fuel nozzle of FIG. 3, further illustrating a set of vanes, with each vane of the set of vanes having a first leg and a second leg in accordance with various aspects described herein.

FIG. 10 is a schematic cross-sectional forward looking aft view an exemplary fuel nozzle 504 suitable for use as the fuel nozzle 104 of FIG. 3. The fuel nozzle 504 is similar to the fuel nozzle 104 (FIG. 5), 204 (FIG. 7), 304 (FIG. 8), 404 (FIG. 9), therefore, like parts will be identified with like numerals increased to the 500 series with it being understood that the description of the fuel nozzle 104, 204, 304, 404 applies to the fuel nozzle 504 unless noted otherwise.

The fuel nozzle 504 includes a body 512 forming a central channel 516 and defining a centerline 514. The fuel nozzle 504 can include a centerbody 526. The centerbody 526 can have a portion of a fuel supply system 528, specifically a centerbody fuel supply 532. The fuel nozzle 504 can include a set of vanes 542. At least a portion of the set of vanes 542 have a respective plurality of lobes 554. The plurality of lobes 554 include a waveform 574 with a plurality of apexes 576. The fuel supply system 528 can include a set of vane orifices 582 located along a respective portion of the set of vanes 542. The set of vane orifices 582 can be formed along the plurality of lobes 554. The set of vane orifices 582 can include at least one offset vane orifice 590 that is spaced from the plurality of lobes 554. At least a portion of the set of vanes 542 can include a lobe-free section 562 and a lobe-present section 564. The lobe-free section 562 can include a radially inner portion 570 and a radially outer portion 572. Each vane of the set of vanes 542 extends between a leading edge (not illustrated, e.g., the leading edge 150 of FIG. 3) and a trailing edge 552, and between a root 546 and a tip 548.

The set of vanes 542, like the first group of vanes 245 (FIG. 7), 345 (FIG. 8), can include an intermediate section 566 within the lobe-free section 562. The set of vanes 542, however, include a first leg 595 and a second leg 597. The first leg 595 extends from the root 546 and to the second leg 597. The second leg 597 extends from the first leg 595 and to the tip 548. While only two legs are shown, it will be appreciated that the set of vanes 542 can each include any number of two or more legs.

The first leg 595 is non-parallel to the second leg 597. As such, an included leg angle 598 is formed between where two radially adjacent legs meet (e.g., where the first leg 595 meets the second leg 597). The included leg angle 598 is greater than 90 degrees and less than or equal to 180 degrees.

The benefit of including the set of vanes 542 with the first leg 595 and the second leg 597 is similar to the benefit of having the set of vanes 442 (FIG. 9) with the included extension angle 496 (FIG. 9). Specifically, the use of the first leg 595, the second leg 597, or any other additional leg of the set of vanes 542 can maximize the total circumferential extent of the central channel 516 that the set of vanes 542 inhabit.

The benefit of the present disclosure includes a fuel nozzle with increased mixing capability when compared to a conventional fuel nozzle. For example, the conventional fuel nozzle can include a swirler formed as a vane that produces a swirled air flow within the fuel nozzle. The present disclosure, however, includes a vane that produces the turbulent air flow and can further also produce the swirled air flow. The use of the turbulent air flow has been found to be especially well adapted to mix fuel within the compressed air flow in order to create a uniform mixture of fuel and air. As such, the use of the vane including the plurality of lobes, as described herein, increases the mixing efficiency of the fuel nozzle when compared to the conventional fuel nozzle. Increasing the mixing efficiency reduces the risk of flashback within the fuel nozzle.

While described with respect to a turbine engine, it should be appreciated that the combustor as described herein can be for any engine having a combustor. It should be appreciated that application of aspects of the disclosure discussed herein are applicable to engines with propeller sections or fan and booster sections along with turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A combustion section for a turbine engine, the combustion section comprising a combustor having a combustion chamber, and a fuel nozzle comprising a body defining a centerline and having a central channel having a compressed air flow passage and a mixer, the central channel extending between an inlet and an outlet, the outlet opening to the combustion chamber, and a vane extending from the body, the vane having an outer wall extending radially between a root and a tip in a spanwise direction, and axially between a leading edge and a trailing edge in a chordwise direction, and a plurality of lobes defining a waveform along the outer wall that increases in amplitude in the chordwise direction.

The combustion section of any preceding clause, wherein a farthest axially downstream portion of the plurality of lobes inhabits a region of the vane that extends greater than or equal to 10% and less than or equal to 90% of a spanwise length of the trailing edge in the spanwise direction.

The combustion section of any preceding clause, wherein the fuel nozzle comprises a vane fuel supply that opens to the mixer at a set of vane orifices, with at least a portion of the set of vane orifices being located along a downstream end of the plurality of lobes.

The combustion section of any preceding clause, wherein the plurality of lobes are defined by a plurality of apexes, with at least a portion of the set of vane orifices being located along at least a portion of the plurality of apexes.

The combustion section of any preceding clause, wherein the set of vane orifices are provided along each apex of the plurality of apexes.

The combustion section of any preceding clause, wherein the set of vane orifices are provided along every other apex of the plurality of apexes.

The combustion section of any preceding clause, wherein the set of vane orifices includes at least one offset fuel orifice that is spaced from the plurality of apexes.

The combustion section of any preceding clause, wherein the at least one lobe injection orifice is located along a portion of the trailing edge not defined by the plurality of lobes.

The combustion section of any preceding clause, wherein the plurality of lobes extend to the trailing edge.

The combustion section of any preceding clause, wherein the vane includes a radially outer portion formed without the plurality of lobes.

The combustion section of any preceding clause, wherein the fuel nozzle further comprises a centerbody, with the vane extending between the centerbody and the body; and The vane includes a radially inner portion formed without the plurality of lobes.

The combustion section of any preceding clause, wherein a downstream portion of each of the radially inner portion and the radially outer portion extends less than 10% of a spanwise length of the trailing edge in the spanwise direction.

The combustion section of any preceding clause, wherein a downstream portion of the radially outer portion extends less than 10% of a spanwise length of the trailing edge in the spanwise direction.

The combustion section of any preceding clause, wherein a farthest downstream portion of the plurality of lobes extends a first radial distance with respect to a vane centerline, a farthest downstream portion of the radially inner portion extends a second radial distance with respect to a vane centerline, a farthest downstream portion of the radially outer portion extends a third radial distance with respect to a vane centerline, and each of the first radial distance and the second radial distance are greater than or equal to 5% and less than or equal to 200% of the first radial distance.

The combustion section of any preceding clause, wherein the waveform is defined by a plurality of apexes, and an apex of the plurality of apexes having the largest amplitude is located within a midspan area extending within an area of the trailing edge of greater than or equal to 35% and less than or equal to 65% in the spanwise direction.

The combustion section of any preceding clause, wherein the amplitude between each apex of the plurality of apexes serially increases in the spanwise direction from the root and towards the tip.

The combustion section of any preceding clause, wherein the plurality of lobes have a constant amplitude in the spanwise direction.

The combustion section of any preceding clause, wherein the vane extends a spanwise length along the trailing edge, and each lobe of the plurality of lobes is defined by a maximum amplitude that is greater than or equal to 10% and less than or equal to 40% of the spanwise length.

The combustion section of any preceding clause, wherein the plurality of lobes includes a plurality of apexes, the plurality of apexes including an average amplitude, and a largest amplitude is greater than or equal to 1.02 times and less than or equal to 2 times the average amplitude.

The combustion section of any preceding clause, wherein the plurality of lobes includes a plurality of apexes, the plurality of apexes including an average amplitude, and a smallest amplitude is greater than or equal to 0.5 times and less than or equal to 0.98 times the average amplitude.

The combustion section of any preceding clause, wherein the fuel nozzle includes a fuel supply that opens into the mixer at a set of fuel orifices, the fuel supply having a fuel orifice centerline that intersects the set of fuel orifices at a set of midpoints, and the plurality of lobes includes a plurality of apexes, the plurality of apexes including an average amplitude, with an axially nearest midpoint of the set of midpoints being located an axial distance from the trailing edge, the axial distance being greater than or equal to 0 times and less than or equal to 5 times the average amplitude of the plurality of lobes.

The combustion section of any preceding clause, wherein the vane is included in a plurality of vanes.

The combustion section of any preceding clause, wherein the plurality of vane comprise a first vane, the plurality of lobes of the first vane having a first number of lobes, a second vane, the plurality of lobes of the second vane having a second number of lobes, non-equal to the first number.

The combustion section of any preceding clause, wherein the plurality of vane comprise a first vane, the plurality of lobes of the first vane having a first maximum amplitude at a downstream end, a second vane, the plurality of lobes of the second vane having a second maximum amplitude at a downstream end non-equal to the first maximum amplitude.

The combustion section of any preceding clause, wherein the plurality of vanes comprises a first group of vanes and a second group of vanes located upstream of the first group of vanes.

The combustion section of any preceding clause, wherein the first group of vanes are circumferentially offset from the second group of vanes, with respect to the centerline.

The combustion section of any preceding clause, wherein the first group of vanes and the second group of vanes are alternately circumferentially spaced.

The combustion section of any preceding clause, wherein the first group of vanes and the second group of vanes are circumferentially aligned The combustion section of any preceding clause, wherein the first group of vanes and the second group of vanes are alternately circumferentially spaced.

The combustion section of any preceding clause, wherein the fuel nozzle comprises a vane fuel supply extending through at least a portion of the plurality of lobes and opening to the mixer at a set of vane orifices, with the set of fuel injection orifice being provided only along the second group of vanes.

The combustion section of any preceding clause, wherein the trailing edge of each vane of the second group of vanes is located axially downstream of the trailing edge of each vane of the first group of vanes.

The combustion section of any preceding clause, wherein the fuel nozzle further comprises a centerbody extending through the central channel, the centerbody having an outer surface confronting the central channel, the trailing edge of the vane extending along a tangent line of the outer surface.

The combustion section of any preceding clause, wherein the trailing edge of the vane includes a first leg and a second leg extending from and being non-parallel to the first leg.

The combustion section of any preceding clause, wherein the plurality of lobes are located along both of the first leg and the second leg.

The combustion section of any preceding clause, wherein the first leg extends from the second leg at an included leg angle of greater than 90 degrees and less than or equal to 180 degrees.

The combustion section of any preceding clause, wherein the first leg extends from the second leg in a counterclockwise direction.

The combustion section of any preceding clause, wherein the first leg extends from the second leg in a clockwise direction.

The combustion section of any preceding clause, wherein the vane has a vane centerline extending between the leading edge and the trailing edge, the vane centerline one of either converging radially inwardly towards the centerline, or being parallel to the centerline.

The combustion section of any preceding clause, wherein the vane centerline is non-parallel to the centerline.

The combustion section of any preceding clause, wherein the vane centerline forms a vane angle with respect to the centerline, the vane angle having an absolute value of greater than or equal to 10 degrees and less than or equal to 60 degrees.

The combustion section of any preceding clause, wherein the outer wall includes a lobe-free section and a lobe-present section, the lobe-free section being located upstream of the lobe-present section.

The combustion section of any preceding clause, wherein the vane has a vane centerline, the plurality of lobes extend a first axial length, with respect to the vane centerline, the lobe-free section includes an axially upstream portion that extends a second axial length, with respect to the vane centerline with the second axial length being greater than 0% and less than or equal to 60% of the first axial length.

The combustion section of any preceding clause, wherein the plurality of lobes includes a portion spaced along a first section of the outer wall and a second portion spaced along a second section of the outer wall, the first section and the second section being radially spaced apart by a third section void of the plurality of lobes.

The combustion section of any preceding clause, wherein the plurality of lobes include two or more lobes.

The combustion section of any preceding clause, wherein the plurality of lobes includes two lobes.

The combustion section of any preceding clause, wherein the fuel nozzle further comprises a fuel supply configured to exhaust flow hydrogen containing fuel into the mixer.

The combustion section of any preceding clause, wherein the plurality of lobes are configured to generate a set of voices at the trailing edge from a flow of compressed air flowing over the plurality of lobes.

The combustion section of any preceding clause, wherein the vane is oriented to direct a flow of compressed air such that the flow of compressed air has a swirl number of greater than or equal to 0.2 and less than or equal to 1.5 at the trailing edge.

The combustion section of any preceding clause, wherein the trailing edge at the tip forms an included extension angle with respect to a tangent line of the body, the included extension angle having an absolute value of greater than 0 degrees and less than 90 degrees.

The combustion section of any preceding clause, wherein the included extension angle has an absolute value of greater than or equal to 10 degrees and less than 90 degrees.

A turbine engine comprising a compressor section, combustor section, and a turbine section in serial flow arrangement, with the compressor section providing a supply of compressed air and the combustor section comprising a combustor having a combustion chamber, and a fuel nozzle comprising a body defining a centerline and having a central channel having a compressed air flow passage and a mixer, the central channel extending between an inlet and an outlet, the inlet being fluidly coupled to the supply of compressed air, and the outlet opening to the combustion chamber, a vane extending from the body, the vane having an outer wall extending radially between a root and a tip in a spanwise direction, and axially between a leading edge and a trailing edge in a chordwise direction, and a plurality of lobes defining a waveform along the outer wall that increases in amplitude in the chordwise direction.

The turbine engine of any preceding clause, wherein a farthest axially downstream portion of the plurality of lobes inhabits a region of the vane that extends greater than or equal to 10% and less than or equal 90% of a spanwise length of the trailing edge in the spanwise direction.

The turbine engine of any preceding clause, wherein the fuel nozzle comprises a vane fuel supply that opens to the mixer at a set of vane orifices, with at least a portion of the set of vane orifices being located along a downstream end of the plurality of lobes.

The turbine engine of any preceding clause, wherein the plurality of lobes are defined by a plurality of apexes, with at least a portion of the set of vane orifices being located along at least a portion of the plurality of apexes.

The turbine engine of any preceding clause, wherein the set of vane orifices are provided along each apex of the plurality of apexes.

The turbine engine of any preceding clause, wherein the set of vane orifices are provided along every other apex of the plurality of apexes.

The turbine engine of any preceding clause, wherein the set of vane orifices includes at least one offset fuel orifice that is spaced from the plurality of apexes.

The turbine engine of any preceding clause, wherein the at least one lobe injection orifice is located along a portion of the trailing edge not defined by the plurality of lobes.

The turbine engine of any preceding clause, wherein the plurality of lobes extend to the trailing edge.

The turbine engine of any preceding clause, wherein the vane includes a radially outer portion formed without the plurality of lobes.

The turbine engine of any preceding clause, wherein the fuel nozzle further comprises a centerbody, with the vane extending between the centerbody and the body; and The vane includes a radially inner portion formed without the plurality of lobes.

The turbine engine of any preceding clause, wherein a downstream portion of each of the radially inner portion and the radially outer portion extends less than 10% of a spanwise length of the trailing edge in the spanwise direction.

The turbine engine of any preceding clause, wherein a downstream portion of the radially outer portion extends less than 10% of a spanwise length of the trailing edge in the spanwise direction.

The turbine engine of any preceding clause, wherein a farthest downstream portion of the plurality of lobes extends a first radial distance with respect to a vane centerline, a farthest downstream portion of the radially inner portion extends a second radial distance with respect to a vane centerline, a farthest downstream portion of the radially outer portion extends a third radial distance with respect to a vane centerline, and each of the first radial distance and the second radial distance are greater than or equal to 5% and less than or equal to 200% of the first radial distance.

The turbine engine of any preceding clause, wherein the waveform is defined by a plurality of apexes, and an apex of the plurality of apexes having the largest amplitude is located within a midspan area extending within an area of the trailing edge of greater than or equal to 35% and less than or equal to 65% in the spanwise direction.

The turbine engine of any preceding clause, wherein the amplitude between each apex of the plurality of apexes serially increases in the spanwise direction from the root and towards the tip.

The turbine engine of any preceding clause, wherein the plurality of lobes have a constant amplitude in the spanwise direction.

The turbine engine of any preceding clause, wherein the vane extends a spanwise length along the trailing edge, and each lobe of the plurality of lobes is defined by a maximum amplitude that is greater than or equal to 10% and less than or equal to 40% of the spanwise length.

The turbine engine of any preceding clause, wherein the plurality of lobes includes a plurality of apexes, the plurality of apexes including an average amplitude, and a largest amplitude is greater than or equal to 1.02 times and less than or equal to 2 times the average amplitude.

The turbine engine of any preceding clause, wherein the plurality of lobes includes a plurality of apexes, the plurality of apexes including an average amplitude, and a smallest amplitude is greater than or equal to 0.5 times and less than or equal to 0.98 times the average amplitude.

The turbine engine of any preceding clause, wherein the fuel nozzle includes a fuel supply that opens into the mixer at a set of fuel orifices, the fuel supply having a fuel orifice centerline that intersects the set of fuel orifices at a set of midpoints, and the plurality of lobes includes a plurality of apexes, the plurality of apexes including an average amplitude, with an axially nearest midpoint of the set of midpoints being located an axial distance from the trailing edge, the axial distance being greater than or equal to 0 times and less than or equal to 5 times the average amplitude of the plurality of lobes.

The turbine engine of any preceding clause, wherein the vane is included in a plurality of vanes.

The turbine engine of any preceding clause, wherein the plurality of vane comprise a first vane, the plurality of lobes of the first vane having a first number of lobes, a second vane, the plurality of lobes of the second vane having a second number of lobes, non-equal to the first number.

The turbine engine of any preceding clause, wherein the plurality of vane comprise a first vane, the plurality of lobes of the first vane having a first maximum amplitude at a downstream end, a second vane, the plurality of lobes of the second vane having a second maximum amplitude at a downstream end non-equal to the first maximum amplitude.

The turbine engine of any preceding clause, wherein the plurality of vanes comprises a first group of vanes and a second group of vanes located upstream of the first group of vanes.

The turbine engine of any preceding clause, wherein the first group of vanes are circumferentially offset from the second group of vanes, with respect to the centerline.

The turbine engine of any preceding clause, wherein the first group of vanes and the second group of vanes are alternately circumferentially spaced.

The turbine engine of any preceding clause, wherein the first group of vanes and the second group of vanes are circumferentially aligned The turbine engine of any preceding clause, wherein the first group of vanes and the second group of vanes are alternately circumferentially spaced.

The turbine engine of any preceding clause, wherein the fuel nozzle comprises a vane fuel supply extending through at least a portion of the plurality of lobes and opening to the mixer at a set of vane orifices, with the set of fuel injection orifice being provided only along the second group of vanes.

The turbine engine of any preceding clause, wherein the trailing edge of each vane of the second group of vanes is located axially downstream of the trailing edge of each vane of the first group of vanes.

The turbine engine of any preceding clause, wherein the fuel nozzle further comprises a centerbody extending through the central channel, the centerbody having an outer surface confronting the central channel, the trailing edge of the vane extending along a tangent line of the outer surface.

The turbine engine of any preceding clause, wherein the trailing edge of the vane includes a first leg and a second leg extending from and being non-parallel to the first leg.

The turbine engine of any preceding clause, wherein the plurality of lobes are located along both of the first leg and the second leg.

The turbine engine of any preceding clause, wherein the first leg extends from the second leg at an included leg angle of greater than 90 degrees and less than or equal to 180 degrees.

The turbine engine of any preceding clause, wherein the first leg extends from the second leg in a counterclockwise direction.

The turbine engine of any preceding clause, wherein the first leg extends from the second leg in a clockwise direction.

The turbine engine of any preceding clause, wherein the vane has a vane centerline extending between the leading edge and the trailing edge, the vane centerline one of either converging radially inwardly towards the centerline, or being parallel to the centerline.

The turbine engine of any preceding clause, wherein the vane centerline is non-parallel to the centerline.

The turbine engine of any preceding clause, wherein the vane centerline forms a vane angle with respect to the centerline, the vane angle having an absolute value of greater than or equal to 10 degrees and less than or equal to 60 degrees.

The turbine engine of any preceding clause, wherein the outer wall includes a lobe-free section and a lobe-present section, the lobe-free section being located upstream of the lobe-present section.

The turbine engine of any preceding clause, wherein the vane has a vane centerline, the plurality of lobes extend a first axial length, with respect to the vane centerline, the lobe-free section includes an axially upstream portion that extends a second axial length, with respect to the vane centerline with the second axial length being greater than 0% and less than or equal to 60% of the first axial length.

The turbine engine of any preceding clause, wherein the plurality of lobes includes a portion spaced along a first section of the outer wall and a second portion spaced along a second section of the outer wall, the first section and the second section being radially spaced apart by a third section void of the plurality of lobes.

The turbine engine of any preceding clause, wherein the plurality of lobes include two or more lobes.

The turbine engine of any preceding clause, wherein the plurality of lobes includes two lobes.

The turbine engine of any preceding clause, wherein the fuel nozzle further comprises a fuel supply configured to exhaust flow hydrogen containing fuel into the mixer.

The turbine engine of any preceding clause, wherein the plurality of lobes are configured to generate a set of voices at the trailing edge from a flow of compressed air flowing over the plurality of lobes.

The turbine engine of any preceding clause, wherein the vane is oriented to direct a flow of compressed air such that the flow of compressed air has a swirl number of greater than or equal to 0.2 and less than or equal to 1.5 at the trailing edge.

The turbine engine of any preceding clause, wherein the trailing edge at the tip forms an included extension angle with respect to a tangent line of the body, the included extension angle having an absolute value of greater than 0 degrees and less than 90 degrees.

The turbine engine of any preceding clause, wherein the included extension angle has an absolute value of greater than or equal to 10 degrees and less than 90 degrees.

What is claimed is:

1. A combustion section for a turbine engine, the combustion section comprising:
   a combustor having a combustion chamber; and
   a fuel nozzle comprising:
      a body defining a centerline and having a central channel having a compressed air flow passage and a mixer, the central channel extending between an inlet and an outlet, the outlet opening to the combustion chamber; and
      a vane extending from the body, the vane having:
         an outer wall extending radially between a root and a tip in a spanwise direction, and axially between a leading edge and a trailing edge in a chordwise direction; and
         a plurality of lobes defining a waveform along the outer wall that increases in amplitude in the chordwise direction,
      wherein the vane is included in a plurality of vanes; and
      wherein the plurality of vanes comprises a first group of vanes and a second group of vanes located upstream of the first group of vanes.

2. The combustion section of claim 1, wherein a farthest axially downstream portion of the plurality of lobes inhabits a region of the vane that extends greater than or equal to 10% and less than or equal 90% of a spanwise length of the trailing edge in the spanwise direction.

3. The combustion section of claim 1, wherein the fuel nozzle comprises a vane fuel supply that opens to the mixer at a set of vane orifices, with at least a portion of the set of vane orifices being located along a downstream end of the plurality of lobes.

4. The combustion section of claim 3, wherein the plurality of lobes are defined by a plurality of apexes, with at least a portion of the set of vane orifices being located along at least a portion of the plurality of apexes.

5. The combustion section of claim 4, wherein the set of vane orifices are provided along each apex of the plurality of apexes.

6. The combustion section of claim 4, wherein the set of vane orifices includes at least one offset fuel orifice that is spaced from the plurality of apexes.

7. The combustion section of claim 1, wherein the plurality of lobes extend to the trailing edge.

8. The combustion section of claim 1, wherein the vane includes a radially outer portion formed without the plurality of lobes.

9. The combustion section of claim 1, wherein the waveform is defined by a plurality of apexes, and an apex of the plurality of apexes having the largest amplitude is located within a midspan area extending within an area of the trailing edge of greater than or equal to 35% and less than or equal to 65% in the spanwise direction.

10. The combustion section of claim 1, wherein:
the vane extends a spanwise length along the trailing edge; and
each lobe of the plurality of lobes is defined by a maximum amplitude that is greater than or equal to 10% and less than or equal to 40% of the spanwise length.

11. The combustion section of claim 1, wherein the plurality of lobes includes a plurality of apexes, the plurality of apexes including an average amplitude, and a largest amplitude is greater than or equal to 1.02 times and less than or equal to 2 times the average amplitude.

12. The combustion section of claim 1, wherein the plurality of lobes includes a plurality of apexes, the plurality of apexes including an average amplitude, and a smallest amplitude is greater than or equal to 0.5 times and less than or equal to 0.98 times the average amplitude.

13. The combustion section of claim 1, wherein:
the fuel nozzle includes a fuel supply that opens into the mixer at a set of fuel orifices, the fuel supply having a fuel orifice centerline that intersects the set of fuel orifices at a set of midpoints; and
the plurality of lobes includes a plurality of apexes, the plurality of apexes including an average amplitude, with an axially nearest midpoint of the set of midpoints being located an axial distance from the trailing edge, the axial distance being greater than or equal to 0 times and less than or equal to 5 times the average amplitude of the plurality of lobes.

14. The combustion section of claim 1, wherein the first group of vanes are circumferentially offset from the second group of vanes, with respect to the centerline.

15. The combustion section of claim 1, wherein the fuel nozzle further comprises a centerbody extending through the central channel, the centerbody having an outer surface confronting the central channel, the trailing edge of the vane extending along a tangent line of the outer surface.

16. A combustion section for a turbine engine, the combustion section comprising:
a combustor having a combustion chamber; and
a fuel nozzle comprising:
a body defining a centerline and having a central channel having a compressed air flow passage and a mixer, the central channel extending between an inlet and an outlet, the outlet opening to the combustion chamber; and
a vane extending from the body, the vane having:
an outer wall extending radially between a root and a tip in a spanwise direction, and axially between a leading edge and a trailing edge in a chordwise direction, wherein the trailing edge of the vane includes a first leg and a second leg extending from and being non-parallel to the first leg; and
a plurality of lobes defining a waveform along the outer wall that increases in amplitude in the chordwise direction.

17. The combustion section of claim 1, wherein the vane has a vane centerline extending between the leading edge and the trailing edge, the vane centerline one of either converging radially inwardly towards the centerline, or being parallel to the centerline.

18. The combustion section of claim 1, wherein the outer wall includes a lobe-free section and a lobe-present section, the lobe-free section being located upstream of the lobe-present section.

* * * * *